United States Patent
Robinett

(10) Patent No.: US 6,714,760 B2
(45) Date of Patent: Mar. 30, 2004

(54) MULTI-MODE SATELLITE AND TERRESTRIAL COMMUNICATION DEVICE

(75) Inventor: Robert L. Robinett, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/138,647

(22) Filed: May 3, 2002

(65) Prior Publication Data

US 2002/0177465 A1 Nov. 28, 2002

Related U.S. Application Data

(60) Provisional application No. 60/290,265, filed on May 10, 2001.

(51) Int. Cl.[7] .............................................. H04H 1/00
(52) U.S. Cl. .................. 455/3.02; 455/3.02; 455/69; 455/78
(58) Field of Search ........................... 455/3.02, 69, 78, 455/265, 273, 428, 12.1, 552.1, 550.1

(56) References Cited

U.S. PATENT DOCUMENTS

| | | | |
|---|---|---|---|
| 5,073,900 A | * | 12/1991 | Mallinckrodt ............... 370/320 |
| 5,490,284 A | | 2/1996 | Itoh et al. |
| 5,564,076 A | * | 10/1996 | Auvray ........................ 455/76 |
| 5,584,056 A | | 12/1996 | Kim |
| 5,790,587 A | * | 8/1998 | Smith et al. ................. 375/147 |
| 6,137,826 A | * | 10/2000 | Boesch ........................ 375/146 |
| 6,138,010 A | | 10/2000 | Rabe et al. |

FOREIGN PATENT DOCUMENTS

| | | |
|---|---|---|
| EP | 0851598 | 12/1997 |
| EP | 0996241 | 4/1998 |

* cited by examiner

Primary Examiner—William Trost
Assistant Examiner—James D Ewart
(74) Attorney, Agent, or Firm—Philip R. Wadsworth; Gregory D. Ogrod

(57) ABSTRACT

The present invention provides a multiple band mobile radio (also referred to as a Wireless Communication Device (WCD)) capable of communicating with both a satellite communication system and a terrestrial communication system. The satellite communication system can be, for example, a Low Earth Orbit (LEO) satellite system. The terrestrial communication system can be a Personal Communication System (PCS), or a cellular system, including either an analog or a digitally based cellular system. The cellular analog system can be AMPS. The digitally based cellular system can be a CDMA or a TDMA based communication system. The WCD can concurrently receive signals from the terrestrial communication system and the satellite communication system.

41 Claims, 11 Drawing Sheets

MULTI-MODE SATELLITE AND TERRESTRIAL COMMUNICATION DEVICE

CROSS-REFERENCE TO RELATED APPLICATIONS

This application claims the benefit of Provisional Application No. 60/290,265, filed May 10, 2001, which application is incorporated herein by reference in its entirety.

BACKGROUND OF THE INVENTION

I. Field of the Invention

The present invention relates to wireless communication devices and systems, and more specifically, to a wireless device, such as a wireless telephone or modem, capable of communicating with both satellite and terrestrial communication systems.

II. Related Art

There are presently many different types of radiotelephone or wireless communication systems, including different terrestrial based wireless communication systems and different satellite based wireless communication systems. The different terrestrial based wireless systems can include Personal Communications Service (PCS) and cellular systems. Examples of known cellular systems include the cellular Analog Advanced Mobile Phone System (AMPS), and the following digital cellular systems: Code Division Multiple Access (CDMA) systems; Time Division Multiple Access (TDMA) systems; and newer hybrid digital communication systems using both TDMA and CDMA technologies. A CDMA cellular system is described in the Telecommunications Industry Association/Electronic Industries Association (TIA/EIA) Standard IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), cdma2000 (such as cdma2000 1x or 3x standards, for example) or TD-SCDMA.

An exemplary CDMA type satellite communication system comprises a constellation of 48 Low Earth Orbit (LEO) satellites and a plurality of ground stations (also referred to as terrestrial fixed stations or gateways). The gateways connect one or more known communication systems and networks to one or more satellite user terminals through the plurality of LEO satellites. Terrestrial based communication systems linked with the gateways can include, for example, telephony ground lines coupled with the Public Switched Telephone Network (PSTN), cellular and PCS systems, dedicated optical or microwave links, or the Internet. The satellite user terminals can be mobile, portable, or fixed terminals, as desired.

Typically, each satellite user terminal can receive and transmit to multiple satellites. This provides a desired level of satellite or spatial diversity. The satellite user terminals use such satellite diversity to improve satellite communication coverage by avoiding blockage of a line-of-site between the satellite user terminal and any given satellite. In some systems, the satellites serve only as frequency translators and repeaters. They may not contain or use specialized signal modulation or demodulation capabilities for changing the signal content, protocols, or structure. A signal transmitted from a user terminal to a satellite is referred to as a satellite uplink signal or frequency. A signal transmitted from the satellite to the user terminal is referred to as a satellite down link signal or frequency. From the perspective of the satellite being a bent-pipe or simple repeater, those signals traversing from the gateway to user terminals are referred to as forward link (communication) signals and those signals traversing from the user terminal to a gateway are referred to as reverse link signals (as viewed from the user terminal perspective).

The satellite converts the satellite uplink frequency (user terminal reverse link) into a gateway-satellite system forward link frequency, transmitted from the satellite to the gateway.

Also, the satellite converts the satellite down link frequency to a satellite system reverse link frequency, transmitted from the satellite to the user terminal (user terminal forward link). For example, if the user terminal down link frequency is 2500 Megahertz (MHz) and its uplink frequency is 1600 MHz, the satellite maps or translates signals at these frequencies to other desired link frequencies, such as 5100 MHz and 6900 MHz, respectively. Each satellite down link or forward link communication signal pattern has a series or set of "beams" (or sectors) illuminating a footprint on the surface of the Earth. A typical satellite might use sixteen such beams. Sometimes multiple beams at different frequencies are used to illuminate the same given area in a single "beam" pattern, with each being referred to as a "sub-beam."

For CDMA communication systems using Pseudo-Noise (PN) or pseudo-random codes for modulation, each down link beam, and generally each satellite, uses a separate Pseudo-Noise (PN) code phase offset value for purposes of beam identification. Within each beam, orthogonal codes, such as Walsh codes, are used for beam or sub-beam channelization, creating a series of individual code channels for communicating with respect to each user terminal. In practice, the beams from one satellite form a footprint that can cover large geographical regions such as entire countries like the United Sates. The satellites receive the satellite uplink or reverse link communication signals from user terminals also using a series or set of beams (or sectors) in a pattern, typically sixteen. The forward and reverse link beam patterns need not be identical.

In an exemplary CDMA satellite wireless communication system, a common frequency, or set of frequencies defining the different beams, is used by each gateway transmitting to or through the satellites. Common radio frequencies allow simultaneous communication through multiple satellites to or from one gateway. Individual user terminals are separated by the use of lengthy or high chip-rate PN codes on the reverse communication signal link and orthogonal or Walsh Codes (and sub-beams) on the forward communication signal link. The high-rate PN codes and Walsh Codes are used to modulate signals transmitted from gateways and user terminal transceivers. Transmitting terminals (gateway and user terminal) may use different PN codes offset in time from one another (and/or Walsh codes), thereby producing transmitted signals that can be separately received at a receiving terminal.

Each of the gateways transmits a pilot signal having a common PN spreading code or code pair that is offset in code phase from the pilot signal of other gateways. Unique pairs of PN codes can be used to identify satellites within a particular orbital plane. Additionally, each gateway may have a unique identifying PN code and each down link beam (from a satellite to a user terminal) has a different PN code offset with respect to other down link beams for the satellite.

During system operation, a user terminal has a model of the satellite constellation and the user terminal is provided with a list of PN codes and PN code phase offsets for each satellite coming into or within view of the user terminal, or for gateways. Moreover, an outer PN code sequence, as described in U.S. patent application Ser. No. 09/169,358 entitled *"Multi-Layered PN Code Spreading In A Multi-User Communications System"* by Harms et al, and incorporated herein by reference, can be used to identify specific signal sources such as gateways or satellites.

This PN code can be used to derive a time and phase difference between satellites in view at any time, or having the same and/or different orbits. The user terminal is equipped with elements useful for acquiring and tracking beams from multiple satellites in multiple orbits simultaneously.

CDMA technology provides a mechanism for hand-off between satellite beams by changing PN codes used to demodulate or de-spread the received signals. Generally, this can be accomplished by using one or more codes in a set of codes, and changing the phase of the codes to match different code phase offsets used between different signal sources or beams. When more than one satellite is in view of a user terminal, the user terminal can communicate with the gateway through the more than one satellites. As a result, a call hand-off between satellites can be achieved at the gateway for the user terminal. This ability to communicate with multiple satellites gives the system satellite (also referred to as spatial) diversity. If trees, mountains or buildings block a satellite link to a user terminal, the user terminal can keep the communications link active by handing off to another satellite in view.

An exemplary satellite communication system is a global communication system with global roaming capability. Best communication results are achieved when there is a line-of-sight between a user terminal and a satellite. Preferably, the user terminal has an unobstructed view of a satellite. In cities and urban environments, such unobstructed views can be difficult to achieve. Moreover, a satellite terminal user may find it more convenient to use a radio telephone or wireless communication device, including wireless modems, inside a building.

Currently, a system user can achieve some level of mobile communication with global roaming capabilities for communication anywhere on the Earth using, in combination, an INMARSAT satellite terminal and a cellular phone. The INMARSAT satellite terminal is disadvantageously bulky and expensive, and fails to provide cellular interoperability. Therefore, the user is required to carry a second means of communication, that is, the cellular phone, which may not be operable in many areas.

Alternative systems are available to achieve global roaming using a satellite phone. However, such phones are expensive, relatively bulky, and require a large number of communication accessories.

Therefore, there is a need for a small, inexpensive mobile radiotelephone or wireless device that can operate with a satellite system and with terrestrial PCS systems and/or cellular systems, such as a CDMA cellular system, a TDMA cellular system, or an analog cellular system.

It is also desirable to minimize size, weight, and power requirements, and cost with respect to such a mobile wireless device or terminal.

SUMMARY OF THE INVENTION

The present invention provides a multiple band mobile radiotelephone (also referred to as a mobile radio and a Wireless Communication Device (WCD)) capable of communicating with both a satellite communication system and a terrestrial communication system. The satellite communication system can be a LEO satellite system. The terrestrial communication system can be a PCS/cellular system, including both analog and digitally based cellular systems. A cellular analog system can be AMPS. A digitally based cellular system can be a CDMA system. The WCD can concurrently receive signals from a terrestrial communication system and a satellite communication system. This is useful for receiving paging signals from the satellite communication system while communicating with the terrestrial communication system, and for satellite coverage monitoring.

The WCD includes a satellite communication transmit channel (also referred to as a satellite transmit channel) and a terrestrial communication transmit channel (also referred to as a terrestrial transmit channel). Each of these transmit channels includes an Intermediate Frequency (IF) section, a frequency up-converter or mixer, and a Radio Frequency (RF) section. The IF sections, the mixers, and the RF sections of these two transmit channels include common portions shared between the transmit channels.

The WCD includes a satellite communication receive channel (also referred to as a satellite receive channel) and a terrestrial communication receive channel (also referred to as a terrestrial receive channel). Each of these receive channels includes an RF section, a frequency down-converter or mixer, and an IF section. The RF sections, mixers, and IF sections of these two receive channels include common portions shared between the receive channels.

The WCD includes a first signal source to provide a first Local Oscillator (LO) reference signal to both the satellite and terrestrial communication transmit channels. In several embodiments, the first signal source also provides an LO reference signal to the satellite and terrestrial receive channels. A second signal source provides a second LO reference signal, independent of the first LO reference signal, to the satellite and terrestrial receive channels.

The above-mentioned common transmit channel portions and common receive channel portions, and independent local oscillators, permit the WCD to be advantageously constructed as a small, portable hand-held radiotelephone or wireless device. Therefore, the user of the WCD can conveniently carry a single, small device instead of, for example, two different devices: a terrestrial cellular and/or PCS phone, and a large expensive satellite phone for global phone coverage. This also applies to wireless devices that act as wireless modems or data transfer terminals, such as when used by portable computers.

As mentioned above, the present invention advantageously provides a small, inexpensive mobile transceiver that can operate with a satellite system and a terrestrial PCS/cellular system, such as a CDMA, TDMA or analog (for example, AMPS) cellular system.

The present invention has the advantage of minimizing cost, and minimizing size, weight, and power requirements, by sharing common signal paths and components in the mobile transceiver between different transmit channels and the different receive channels, as well as other advantages and characteristics.

BRIEF DESCRIPTION OF THE DRAWINGS

The foregoing and other features and advantages of the invention will be apparent from the following, more particular description of the exemplary embodiments of the invention, as illustrated in the accompanying drawings.

DETAILED DESCRIPTION OF THE EMBODIMENTS

I. Overview

Figure 1:
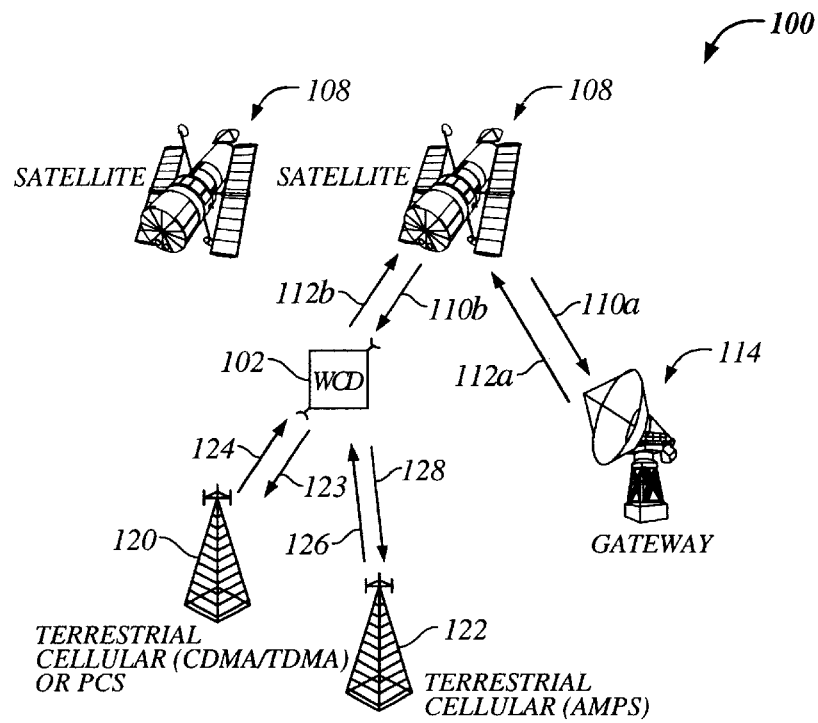
FIG. 1 is an illustration of an example environment in which an embodiment of a wireless communication device (WCD) of the present invention can operate.

FIG. 1 is an illustration of an example environment 100 in which a wireless communication device (WCD) 102 of the present invention can operate. Environment 100 includes a constellation of communication satellites 108. Communication satellites 108 are part of a satellite based communication system. Each of the satellites 108 can occupy a Low Earth Orbit, and transmits one or more down-link RF communication signals 110a, 110b, etc. (each generally referred to as signal 110), toward the Earth. Each of the satellites can receive one or more up-link RF communication signals 112a, 112b, etc. (each generally referred to as signal 112), from a terrestrial based transmitter compatible with the satellites 108. Satellites 108 communicate with a ground-based gateway station 114. Gateway station 114 is linked with one or more of various known communication systems and networks, such as a PSTN, the Internet, and so on.

Environment 100 further includes terrestrial based communication systems and networks. For example, the terrestrial based communication systems can include a first plurality of cellular and/or PCS communication cell-sites (for example, base stations and antenna support structures) represented at 120, and a second plurality of cellular and/or PCS base stations represented at 122. Base stations 120 can be associated with a terrestrial based CDMA or TDMA (or hybrid CDMA/TDMA) digital communication system. Therefore, base stations 120 can transmit a CDMA or a TDMA type terrestrial signal 123 to a mobile station or user terminal (WCD 102) and can receive a TDMA or a CDMA signal 124 from the mobile unit or terminal. The terrestrial signal can be formatted in accordance with IMT-2000/UMT standards (that is, International Mobile Telecommunications System 2000/Universal Mobile Telecommunications System standards). The terrestrial signal can be a wideband CDMA signal (referred to as a WCDMA signal), or a signal conforming to cdma2000 standards (such as cdma2000 1× or 3× standards, for example).

On the other hand, base stations 122 can be associated with an analog based terrestrial communication system (such as AMPS). Therefore, base stations 122 can transmit an analog based communication signal 126 to a mobile terminal and can receive an analog based communication signal 128 from the mobile terminal.

Wireless communication devices each have or comprise apparatus such as, but not limited to, a wireless handset or telephone, a cellular telephone, a data transceiver, or a paging or position determination receiver, and can be hand-held, or portable as in vehicle mounted (including cars, trucks, boats, trains, and planes), as desired. However, while wireless communication devices are generally viewed as being mobile, it is also understood that the teachings of the invention are applicable to "fixed" units in some configurations. In addition, the teachings of the invention are applicable to wireless devices such as one or more data modules or modems which may be used to transfer data and/or voice traffic, and may communicate with other devices using cables or other known wireless links or connections, for example, to transfer information, commands, or audio signals. In addition, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as 'users' and 'mobiles' in some communication systems, depending on preference.

Figure 2:
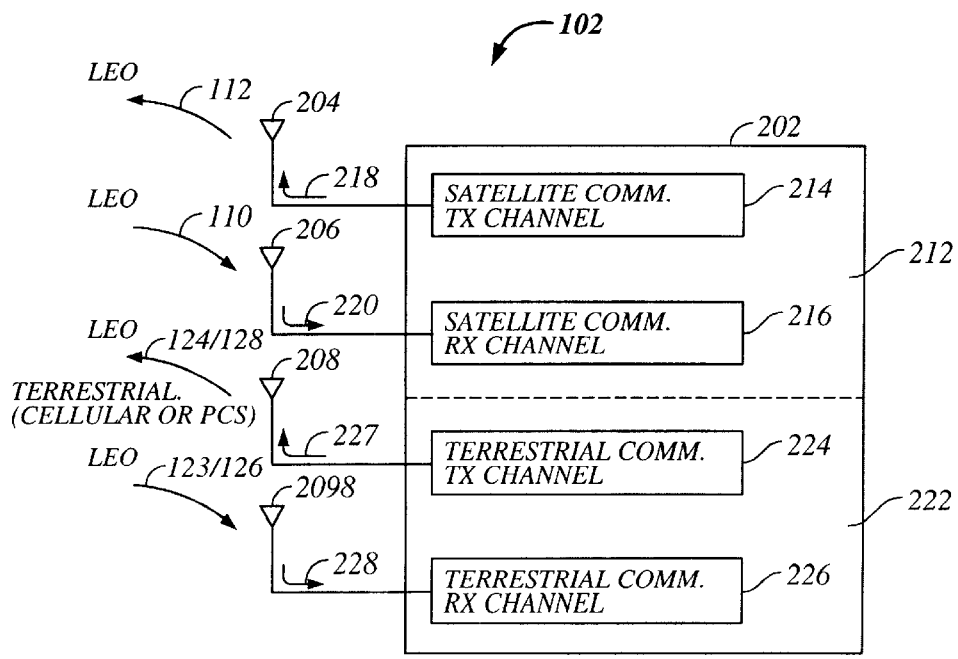
FIG. 2 is a high level block diagram of a WCD useful for implementing the WCD of FIG. 1.

FIG. 2 is a high-level block diagram of a wireless communication device useful for implementing WCD 102, according to an embodiment of the invention. WCD 102 can be configured to operate in at least one of the following modes:

1. a satellite communication mode for communicating with a satellite communication system using satellites 108; and
2. a terrestrial communication mode for communicating with a terrestrial PCS/cellular digital/analog communication system.

To achieve such multi-mode operation, WCD 102 includes a unique multimode transceiver 202 coupled to the following multimode transceiver antennas:

1. a transmit antenna 204 to transmit RF signal 112 to satellites 108;
2. a receive antenna 206 to receive RF signal 110 from satellites 108; and
3. a common transmit/receive antenna 208, such as a whip or helical antenna, to transmit RF signals 124/128 to the associated terrestrial communication systems mentioned above, and to receive RF signals 123/126 from the terrestrial communication systems.

Multimode transceiver 202 includes a satellite communication transceiver 212 having a Satellite Communication Transmit Channel 214 (also referred to as a Satellite Transmit Channel 214) and a Satellite Communication Receive Channel 216 (also referred to as a Satellite Receive Channel 216). Satellite Transmit Channel 214 includes RF, IF, and baseband signal processing sections (also referred to as "paths") to produce an RF transmit signal 218, and to provide the RF transmit signal to antenna 204. Receive antenna 206 provides an RF received signal 220 to Satellite Receive Channel 216. Satellite Receive Channel 216 includes RF, IF, and baseband signal processing sections, as desired, to process the received signal.

Multimode transceiver 202 also includes a terrestrial mode transceiver 222 having a Terrestrial Communication Transmit Channel 224 (also referred to as a Terrestrial Transmit Channel 224) and a Terrestrial Communication Receive Channel 226 (also referred to as Terrestrial Receive Channel 226). Terrestrial Transmit Channel 224 includes RF, IF, and baseband signal processing components to produce an RF transmit signal 227, and to provide the RF transmit signal to common antenna 208. Satellite Transmit Channel 214 and Terrestrial Transmit Channel 224 share common baseband, IF and RF sections in transceiver 202, as will be further described below. Common antenna 208 also provides an RF received signal 228 to Terrestrial Receive Channel 226. Terrestrial Receive Channel 226 includes RF, IF, and baseband signal processing sections to process received signal 228. In another embodiment, separate receive and transmit antennas can replace the common antenna 208. Satellite and terrestrial receive channels 216 and 226 share common RF, IF and baseband sections, as will be further described below.

II. WCD First Embodiment

Figure 3A:
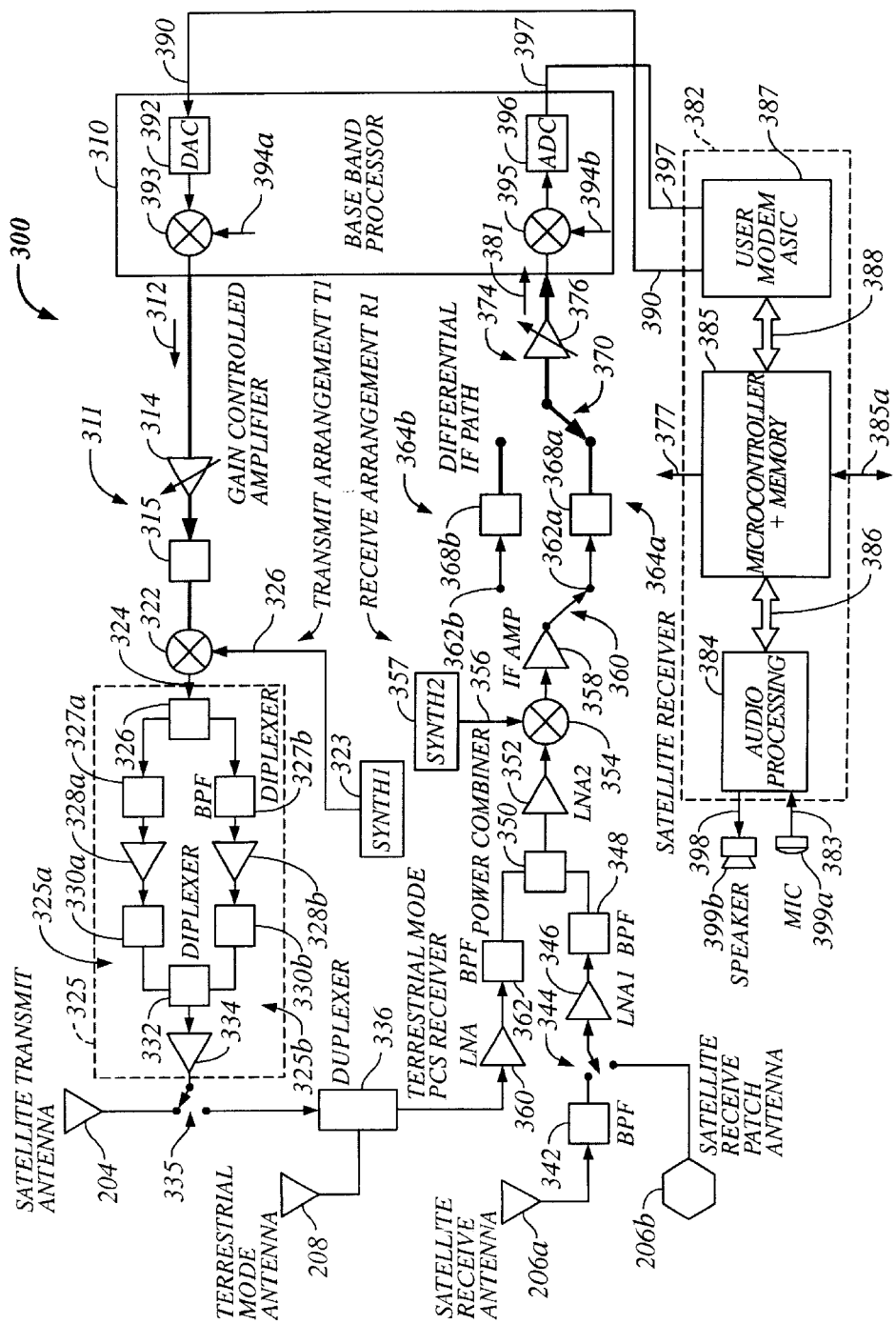
FIG. 3a is a detailed block diagram of the WCD of FIG. 2, including a first transmit arrangement and a first receive arrangement, according to a first embodiment of the present invention.

WCD 102 can have many different specific embodiments. FIG. 3a is a detailed block diagram of a WCD 300 useful for implementing WCD 102, according to a first embodiment of the invention.

A. Satellite and Terrestrial Communication Transmit Channels

WCD 300 includes a first transmit arrangement T1 of Satellite and Terrestrial Transmit Channels 214 and 224 (depicted in FIG. 2) to produce RF transmit signals 112 and 124/128. With reference to FIG. 3a, Satellite and Terrestrial Transmit Channels 214 and 224 include a common baseband processor (BBP) 310 shared between the channels to produce an IF transmit signal 312 corresponding to either RF satellite signal 112 or terrestrial transmit signals 124/128. At any given time, transmit IF signal 312 corresponds to either the satellite transmit signal or the terrestrial transmit signal, but not both. BBP 310 preferably produces IF signal 312 as a differential transmit IF signal at an exemplary IF transmit frequency of 228.6 MHz. BBP 310 provides IF transmit signal 312 to a common transmit IF signal section or path 311 including a common IF gain controlled amplifier 314 followed by a common IF Band Pass Filter 315, which can be realized using a Surface Acoustic Wave (SAW) filter. IF Filter 315 has a frequency bandwidth compatible with both the satellite and terrestrial transmit signals (such as analog and digital cellular, PCS, cdma2000, or WCDMA, and so on) it is to filter. Gain controlled amplifier 314 amplifies IF signal 312 and provides an amplified IF signal to IF BPF 315. IF BPF 315 provides an amplified, filtered IF signal to an input of a common frequency up-converter, such as a wide-band mixer 322. All of the above mentioned transmit IF signal processing components and associated IF received signals, including the IF input of mixer 322, are preferably, though not necessarily, differential in the manner of signal processing. The same is generally true for each of the IF signal processing components and signals to be described below.

Mixer 322 frequency up-converts the amplified, filtered IF signal to an RF transmit signal 324 based on a first LO reference signal 326 provided to mixer 322. Mixer 322 up-converts the transmit IF signal to an RF signal (that is, signal 324) having a frequency corresponding to a transmit frequency band of the satellite communication system or the terrestrial communication system, depending on whether satellite or terrestrial transmit communication is desired. Therefore, common mixer 322 has a frequency bandwidth sufficiently wide to accommodate both the satellite system and the terrestrial system frequency bands.

WCD 300 includes at least one LO reference signal source 323 to produce LO reference signal 326. In one embodiment, signal source 323 is a dual-band frequency synthesizer, such as a dual-band phase locked loop (PLL). Therefore, signal source 323 can provide reference signal 326 at frequencies corresponding to both the satellite and the terrestrial transmit modes of operation.

Mixer 322 provides RF transmit signal 324 to an input of an RF transmit section 325 to amplify and filter the RF transmit signal. RF section 325 includes a first (input) RF routing mechanism, such as a diplexer 326, following mixer 322. Diplexer 326 includes a frequency selective power splitter to route RF signal 324 at the input of the diplexer to one of:

1. a satellite RF path 325a; and
2. a terrestrial RF path 325b, depending on whether the frequency of RF signal 324 corresponds to the satellite or the terrestrial transmit frequency band.

Satellite RF path 325a includes the following, serially connected, RF signal processing components: a first RF BPF 327a to filter RF signal 324; an RF amplifier 328a to amplify a filtered RF signal produced by BPF 327a; and a second RF BPF 330a to further filter an amplified RF signal produced by RF amplifier 328a. BPF 330a provides an RF signal to a first input of a second (output) RF routing mechanism, such as an RF diplexer 332.

Similar to satellite path 325a, terrestrial RF path 325b includes the following, serially connected, RF signal processing components: a first RF BPF 327b; an RF amplifier 328b; and a second RF BPF 330b. RF BPFs 327b and 330b have frequency bandwidths compatible with the terrestrial transmit signals to be filtered by BPF 327b and BPF 330b, such as analog or digital cellular, PCS, cdma2000, or WCDMA signals, etc. BPF 330b provides an RF signal to a second input of RF diplexer 332. Diplexer 332 routes the RF signals from both satellite and terrestrial paths 325a and 325b to a common, dual-band power amplifier 334. Dual-band power amplifier 334 has a power amplification bandwidth sufficiently large to power amplify RF signals corresponding to both the satellite and the terrestrial frequency transmit bands.

Power amplifier 334 provides a power amplified RF transmit signal to an RF switch 335. When satellite transmit communication is desired, switch 335 is configured to route the power amplified transmit RF signal to satellite transmit antenna 204, as depicted in FIG. 3a. On the other hand, when terrestrial transmit communication is desired, switch 335 is configured to route the power amplified transmit RF signal to an input of a duplexer 336 (further described below) associated with the terrestrial transmit and receive channels, and from the duplexer to terrestrial transmit antenna 208 coupled to an output of the duplexer.

Duplexer 336 includes RF transmit and receive filter sections to separate the terrestrial RF transmit and receive signals (described below) from one another. This is accomplished because the terrestrial RF transmit and receive signals 124/128 and 123/126 are combined at common terrestrial antenna 208. Duplexer 336 provides the power amplified, terrestrial RF transmit signal at the duplexer input to common antenna 208. Duplexer 336 can be omitted in an alternative embodiment including separate terrestrial RF transmit and receive antennas.

From the above description it can be appreciated Satellite and Terrestrial Transmit Channels 214 and 224 each share BBP 310, IF section 311, mixer 322, diplexers 326 and 332, and power amplifier 334. Such component sharing advantageously reduces component part count, and thus cost, size, weight, and power requirements in the present invention.

B. Satellite and Terrestrial Communication Receive Channels

WCD 300 includes a first receive arrangement R1 of Satellite and Terrestrial Receive Channels 216 and 226. In Satellite Receive Channel 216 (depicted at the bottom left-hand side of FIG. 3a), an antenna 206a (such as a quadrafilar helix antenna, for example, as described in U.S. Pat. No. 5,990,847 issued to Filipovic et al., Nov. 23, 1999) provides a low power, received RF satellite signal to an RF BPF 342. BPF 342 filters interference (such as image band frequencies, terrestrial signals including PCS/cellular signals, and RF transmit energy produced by Satellite Transmit Channel 214) from the received RF satellite signal. BPF 342 provides a filtered received RF satellite signal to a first input of an RF switch 344.

WCD 300 can also include a patch antenna 206b to provide a low power received RF satellite signal to a second input of RF switch 344. Since patch antenna 206b is generally a relatively compact antenna, it can be conveniently positioned within a housing or an exterior casing of WCD 300, for example, on an RF circuit board within the casing. Antenna 20b can be used to receive paging or short text messages at low data rates in cases where antenna 206a is stowed or removed. That is, antenna 206b is generally used to monitor signals from satellites.

RF switch 344 selectively provides the received RF satellite signal from either antenna 206a or 206b to a satellite RF section, including a Low Noise Amplifier (LNA) 346 and an RF BPF 348 following the LNA. BPF 348 provides an amplified, filtered, received RF (satellite) signal to a first input of an RF power combiner 350.

In Terrestrial Receive Channel 226, common terrestrial antenna 208 provides a received RF terrestrial signal (corresponding to terrestrial signals 123/126) to duplexer 336. Duplexer 336 provides the received RF terrestrial signal to a Terrestrial Receive Channel RF section, including an LNA 360 and an RF BPF 362 following the LNA. BPF 362 provides an amplified, filtered, received RF (terrestrial) signal to a second input of RF power combiner 350.

Power combiner 350 routes the RF satellite and terrestrial signals at the power combiner respective first and second inputs to a common LNA 352 coupled to an output of the power combiner. Common LNA 352 provides an amplified common RF signal to a common down-converter, such as a wideband mixer 354. Mixer 354 is sufficiently wideband to accommodate the different receive frequency bands of the satellite and terrestrial received RF signals. Mixer 354 frequency down-converts either one of the received RF satellite and terrestrial signals to a received IF signal having an exemplary IF frequency of 183.6 MHz (for the typical frequencies of interest for WCD operation), based on an LO reference signal 356 provided to the mixer. WCD 300 includes a second LO reference signal source 357 to produce LO reference signal 356. In one embodiment, signal source 357 is a dual-band frequency synthesizer, such as a dual-band phase locked loop (PLL). Therefore, signal source 357 can provide reference signal 356 at frequencies corresponding to either the satellite or the terrestrial receive modes of operation, and independently of reference signal 326 provided by LO source 323.

Mixer 354 provides the received IF signal to a common receive IF amplifier 358. Amplifier 358 provides an amplified IF signal to an input of a first (or upstream) IF routing mechanism, such as an IF switch 360. Switch 360 can selectively route the IF signal at the switch input to a first switch output 362a coupled to a satellite IF path 364a, or a second switch output 362b coupled to a terrestrial IF path 364b, separate from satellite IF path 364a, in accordance with a mode select signal (not shown) provided to the switch. For example, such a mode select signal can be provided as a result of a manual user input in which a particular mode is selected, or as part of processing pre-selected or pre-stored commands or method steps which cause the selection of mode based on certain values or criteria such as current signal quality, service or feature availability, or cost.

Satellite IF path 364a includes an IF BPF filter 368a, which can be a SAW filter. IF BPF 368a has a frequency bandwidth compatible with a frequency bandwidth of the satellite signal it is to filter. BPF 368a provides a filtered IF satellite signal to a first input of a second (or downstream) IF routing mechanism, such as an IF switch 370. Separate terrestrial IF path 364b includes an IF BPF filter 368b, which can be a SAW filter. BPF 368b provides a filtered IF terrestrial signal to a second input of second IF switch 370. BPF 368b has a frequency bandwidth compatible with a frequency bandwidth of the received terrestrial signal it is to filter. For example, BPF 368b has a bandwidth of approximately 1.5 MHz for a cdma2000 1× type communication signal (having an approximate bandwidth of 1.25 MHz), 5 MHz for a WCDMA communication signal (having a bandwidth of approximately 4.96 MHz), and 4 MHz for a cdma2000 3× communication signal (having a bandwidth of approximately 3.75 MHz) (alternatively, a 5 MHz bandwidth IF filter can be used to filter both the WCDMA and cdma2000 3× signals). Second IF switch 370 can selectively route IF signals at the first and second IF switch inputs, respectively, to a switch output coupled to a common IF receive section 374.

Switches 360 and 370 are controlled to operate in the following manner. When the IF signal at the input of switch 360 corresponds to a received satellite signal (that is, when WCD 300 is in the satellite mode), first and second switches 360 and 370 are configured as depicted in FIG. 3, to route the IF signal to satellite IF path 364a, and then to common IF path or section 374. On the other hand, when the IF signal at the input of switch 360 corresponds to a received terrestrial signal (that is, when WCD 300 is in the terrestrial mode), first and second switches 360 and 370 are configured to route the IF signal to terrestrial IF path 364b, and then to common IF section 374.

Common IF section 374 includes an Automatic Gain Controlled (AGC) IF amplifier 376. AGC amplifier provides an amplified IF received signal 381 to BBP 310.

RF switches and differential IF switches in the present invention (such as switches 335, 344, 360 and 370, and further switches to be described below) can be implemented using diodes, transistors, Field Effect Transistors (FETs), mechanical relays, and/or other known switching devices or elements. IF switches are preferably differential. Switches can be replaced with power splitters and power combiners, and diplexers, as appropriate or desired.

C. Local Oscillators

In one embodiment, reference signal source 323 is a dual-band frequency synthesizer, such as a dual-band phase locked loop (PLL). When satellite transmit communication is desired, signal source 323 provides an LO signal having frequencies in a first RF frequency band corresponding to the satellite transmit (uplink) frequency band. When terrestrial transmit communication is desired, signal source 323 provides an LO signal having frequencies in a second RF frequency band corresponding to the terrestrial transmit (WCD to base station) band.

In the present embodiment, signal sources 323 and 357 are independently controlled such that respective frequencies of LO reference signals 326 and 356 are correspondingly independently controlled. This is in contrast to some known transceivers having transmit and receive LO signal sources to produce transmit and receive reference signals having frequencies dependant on one another.

In the present invention, independent control of signal sources 323 and 357 advantageously accommodates different transmission and reception frequency spectrum allocations associated with different geographical regions of the Earth. For example, a first country may allocate a satellite receive frequency spectrum from 2480 to 2490 MHz, and a satellite transmit frequency spectrum from 1615 to 1617 MHz. A second country may allocate differently. For example, the second country may allocate a satellite receive frequency spectrum from 2485 to 2491 MHz, and a satellite transmit frequency spectrum from 1610 to 1613 MHz. In such circumstances, the present invention gives communication system operators maximum flexibility for global roaming because the different frequency spectrum allocations are easily accommodated using independent transmit and receive LO frequency control. Additionally, the satellite receiver can operate independently and at the same time as the terrestrial receive and Transmit Channels.

Similarly, independent control of sources 323 and 357 can allow global terrestrial operation of the WCD. For example, sources 323 and 357 can produce respective LO reference signals 326 and 356 having frequencies compatible with terrestrial transmit and receive spectrum allocations in the United States, Japan, Korea, China, and Europe, for example.

D. Frequency Planning

WCD 300 has a first exemplary transmit IF frequency of 228.6 MHz (example for typical frequencies of interest) common to both Satellite and Terrestrial Transmit Channels 214 and 226. WCD 300 has a first exemplary receive IF frequency of 183.6 MHz, which is 45 MHz below the transmit IF frequency. This 45 MHz frequency offset corresponds to a 45 MHz frequency offset between the cellular transmit and receive frequency bands in the United States. Alternatively, WCD 300 has a second exemplary transmit IF frequency of 130.38 MHz, and a corresponding second exemplary receive IF frequency of 85.38 MHz. Other transmit and receive IF frequency pairs are possible because signal sources 323 and 357 are independently controlled.

In the satellite communication mode, WCD 300 communicates with the exemplary CDMA satellite communication system according to one embodiment. Therefore, Satellite Receive Channel 216 receives satellite down-link signals in the frequency range 2480–2500 MHz. Satellite Transmit Channel 214 transmits satellite uplink signals in the frequency range 1610–1622 MHz.

Assuming, for example, a satellite system reverse channel (that is, transmit/uplink) frequency of 1620.42 MHz (or Channel 327 in 30 KHz channel step sizes), and the transmit IF frequency of 228.6 MHz, then a frequency of LO reference signal 326 (that is, the satellite transmit LO frequency) can be determined according to the relationships:

satellite transmit LO=1620.42−228.6 MHz=1391.82 MHz, or alternatively, satellite transmit LO=1620.42−130.38 MHz=1490.04 MHz.

Other frequencies of LO reference signal 326 are possible.

In the terrestrial communication mode (either digital or analog), WCD 300 can transmit and receive cellular signals in one embodiment. As mentioned above, duplexer 336 is configured to separate cellular transmit signal 227 from cellular received signal 228. In one embodiment, corresponding to the United States cellular spectrum allocations, cellular transmit frequencies (for example, from 825 to 845 MHz) are 45 MHz below corresponding cellular receive frequencies (for example, from 870 to 890 MHz). Therefore, duplexer 336 includes transmit and receive filter sections offset in frequency from one another by 45 MHz, such that the transmit and receive filter sections respectively coincide with the cellular transmit and receive frequencies. In addition, the transmit and receive IF frequencies used in WCD 300 are offset from one another by 45 MHz, to correspond to the 45 MHz frequency offset between the cellular transmit and receive frequencies.

Alternative embodiments of the present invention can be used with other terrestrial systems, such as PCS, GSM, ETACS, or TACS systems. For example, an exemplary PCS transmit frequency band in the United States can correspond to the cellular frequency range above, or to a PCS only transmit frequency range of 1850 to 1910 MHz. Similarly, an exemplary PCS receive frequency band in the United States can correspond to the cellular frequency range above, or to a PCS only receive frequency range of 1930 to 1990 MHz. The alternative embodiments of the present invention can accommodate different transmit/receive frequency offsets in the other terrestrial systems by appropriately adjusting the transmit/receive IF frequency offset mentioned above, and by using a duplexer having an appropriate, corresponding frequency offset between the receive and transmit filter sections. For example, the alternate embodiments can use IF receive and transmit frequencies different than those mentioned above, as appropriate or desired, as would be understood by those skilled in the art.

E. Transceiver Transmit Power Control

Transmit IF gain controlled amplifier 314 and receive IF AGC amplifier 376 can be used for both open and closed loop power control in WCD 300. Open loop power control refers to power control implemented exclusively at WCD 300. On the other hand, closed loop power control refers to power control implemented using, inter alia, commands or feedback signals transmitted to WCD 300 by a gateway, or terrestrial base station, for example. An example of terrestrial communication, CDMA open loop power control is described in U.S. Pat. No. 5,056,109, issued to Gilhousen et al., which is incorporated herein by reference.

1. Terrestrial Mode Power Control

In one embodiment, the present invention performs closed loop power control in the terrestrial communication mode using the above mentioned transmit and receive IF AGC amplifiers. The following exemplary process can be used to perform closed loop power control. First, when terrestrial signals 123/126 are received by WCD 300, a gain of receive IF AGC amplifier 376 can be adjusted such that AGC amplifier 376 provides IF received signal 381 to BBP 310 at an appropriate power level. When IF signal 381 is at the appropriate power level, WCD 300 can properly demodulate the received signal and can estimate a received signal power level.

Next, a gain of transmit IF AGC amplifier 314 is adjusted such that a power level of transmit RF signal 226, for example, is a predetermined amount below the estimated received signal power level. This transmit power level can be further adjusted, for example, increased or decreased, based on transmit power correction data transmitted to WCD 300 by a terrestrial base station. In one embodiment, the gain of gain controlled amplifier 314 is adjusted such that the transmit power level of the RF signal provided by power amplifier 334 is 73 decibels (dB) higher than the received power level.

Closed loop power control can be implemented in accordance with the following expression:

Mean Transmit Output Power=k−Mean Received Power+ 0.5*NOM_PWR+0.5*INIT_PWR+sum of all access probe power corrections+sum of all closed loop power control corrections.

Where:

NOM_PWR and NIT_PWR are system parameters (nominal and initial power) each normally set at 0 dB. The access probe power and the closed loop power control corrections are data received from the base station related to power levels for signals from user terminals or mobile stations requesting system access, and closed loop received signal power level indications, respectively. Parameter k is a Turn-Around constant given by the following equation:

$k=(Pt)_c-134+(NF)_c+10\cdot Log(1+\zeta_1+\zeta_2)-10\cdot Log(1-X)$

Where:

$(Pt)_c$ is the base station transmit power, $(NF)_c$ is the base station receiver noise figure, $\zeta_1$, and $\zeta_2$ are interference power ratios from other base stations, and X is a cell loading factor.

Normally the Turn-Around constant k is on the order of −73 dB.

2. Satellite Mode Power Control

The satellite communication mode generally uses a power control mechanism different from that used in the terrestrial communication mode. In this case, the power level of transmitted uplink signal 112 may be set independent of the power level of the received down-link signal 110. The power level of the transmitted signal is generally controlled by gateway 114. Gateway 114 commands WCD 300 to increase or decrease the power level of uplink signal 110, such that gateway 114 receives the uplink signal (transmitted by the WCD) at a predetermined or desired power level. However, WCD 300 could also use the power level of received signals as a basis to adjust its relative transmit power.

F. Baseband Processor and Digital Baseband Section

WCD 300 includes BBP 310 to produce common transmit IF signal 312 in the Satellite and Terrestrial Transmit Channels, and receive common IF signal 381 from common IF path 374 in the Satellite and Terrestrial Receive Channels. WCD 300 also includes a Digital Baseband Section (DBS) 382 coupled to BBP 310, and further described below. BBP 310 and DBS 382 process communication signals in a transmit direction (for example, from WCD 300 to a satellite) and a receive direction (for example, from the satellite to WCD 300), as described below. Therefore, the transmit and receive portions of both BBP 310 and DBS 382 can correspondingly be considered part of the Transmit Channels 214 and 224, and Receive Channels 216 and 226.

Figure 3B:
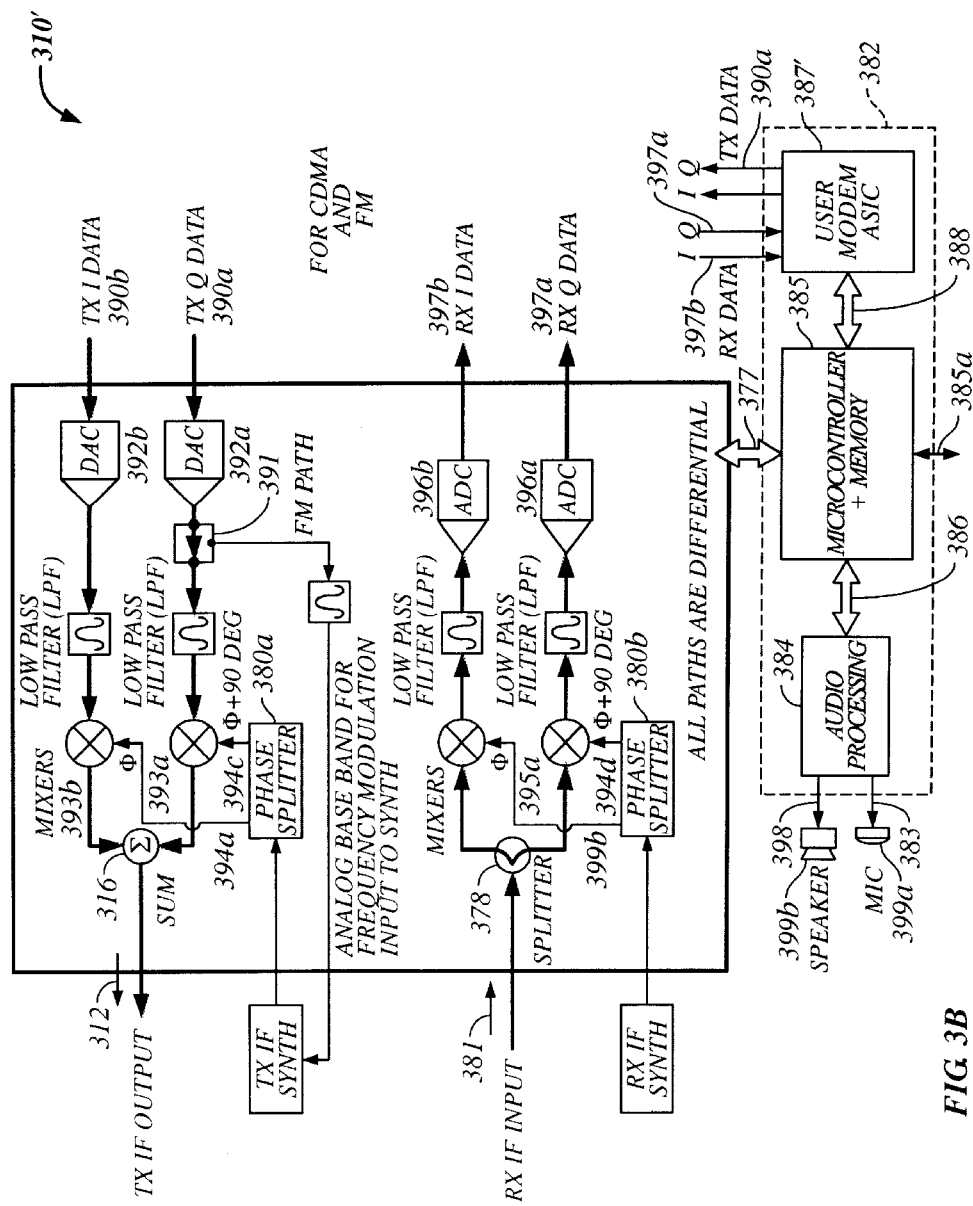
FIG. 3b is a detailed block diagram of a baseband processor useful for implementing the processor 310 of FIG. 3a and subsequent figures.

A more detailed view of a baseband processor 310' used in CDMA and FM type communication systems or signal processing and useful for implementing the present invention is shown in FIG. 3b. In FIG. 3b, a user modem 387' receives I and Q component RX data signals 397b and 397a, respectively, and provides I and Q component TX data signals 390b and 390a, respectively.

For transmission, signals 390a and 390b are input to DAC elements 392a and 392b respectively, which provide analog signal outputs to Low Pass Filters and mixers 393a and 393b, respectively. Mixers 393a and 393b up-convert the signals to the appropriate IF frequency and input them to a summer 316 to provide a summed differential TX IF output signal 312, which is further processed as shown in the figures. A phase splitter 380a is connected to receive input from the TX IF synthesizer to provide a synthesizer input 394a to mixer 393b and a 90 degree out of phase synthesizer input 394c to the other mixer 393a, of the two mixers.

For FM signal processing a switch element 391 connected in series with DAC 392a transfers the analog signal to a filter and then the TX IF synthesizer for use as analog baseband for frequency modulation.

For signal reception, common IF signal 381 is input to a splitter 378 which provides inputs to each of two mixers 395a and 395b for down-conversion and which in turn provide their respective baseband analog outputs to low pass filters and Analog-to-Digital Converters or ADC elements 396a and 396b, respectively. A phase splitter 380b is connected to receive input from the RX IF synthesizer to provide a synthesizer input 394b to mixer 395b and a 90 degree out of phase synthesizer input 394d to the other mixer 395a. Both phase splitters 380a and 380b can further include a "divide-by" function to divide the input frequency by a factor of 2 or more, as desired, to generate an appropriate mixer input frequency dependent upon the pre-selected output frequency of the respective IF synthesizer.

The ADC elements 396a and 396b digitize the signals appropriately and provide an I (in-phase) RX data signal 397b and a Q (quadrature) RX data signal 397b, which are then processed by the user modem as shown in the figures.

1. Transmit Direction

A user of WCD 300 can provide audio input to the WCD using a microphone 399a. Microphone 399a provides an analog audio signal 383 to an audio processor 384 of DBS 382. Audio processor 384 digitizes and process the audio signal, to produce a digital audio transmit signal. Audio processor 384 provides the digital audio transmit signal to a controller and memory section 385 (of DBS 382) over a bi-directional digital bus 386. Controller and memory section 385 couples the digital audio transmit signal to a user modem 387 (of DBS 382) over a second bi-directional digital bus 388. Modem 387 modulates the digital audio transmit signal in accordance with a selected transmit mode (for example, in accordance with the satellite transmit mode or the terrestrial transmit mode) to produce a modulated, digital baseband transmit signal 390. Signal 390 can include both an I (in-phase) component and a Q (quadrature) component.

Modem 387 provides digital baseband transmit signal 390 to BBP 310, and more specifically, to a Digital-to-Analog Converter (DAC) 392. DAC 392 converts digital baseband transmit signal 390 to an analog baseband transmit signal. DAC 392 provides the analog baseband transmit signal to a mixer 393. Mixer 393 frequency up-converts the analog baseband transmit signal to IF transmit signal 312 based on a reference signal 394a provided to mixer 393.

2. Receive Direction

In the receive direction, AGC amplifier 376 provides IF received signal 381 to a mixer 395 of BBP 310. Mixer 395 frequency down-converts IF received signal 381 to produce a baseband analog received signal based on a reference signal 394b provided to mixer 395. Mixer 395 provides the baseband analog received signal to an Analog-to-Digital Converter (ADC) 396. ADC 396 digitizes the baseband analog received signal to produce a digital baseband received signal 397. Signal 397 can include both an I (in-phase) component and a Q (quadrature) component. BBP 310 provides digital baseband received signal 397 to user modem 387. User modem 387 demodulates the digital baseband received signal 397 to produce a demodulated digital signal. Modem 387 provides the demodulated digital signal to controller and memory section 385 over digital bus 388. Controller and memory section 385 couples the demodulated digital signal to audio processor 384 over digital bus 386. Audio processor 384 converts the demodulated digital signal to an analog signal 398. Audio processor 384 provides analog signal 398 to a speaker 399b.

G. Transceiver Controller and Mode Control

The user can provide information and mode control commands to WCD 300 to configure the WCD to operate in different satellite and terrestrial communication operating modes (as mentioned above), or these modes can be selected based on preset service provider or manufacturer supplied information or criteria. The user, or a company, provides such mode control information to controller and memory 385 (also referred to as controller 385) through an Input/Output (I/O) interface 385a. In response to the mode control information provided by the user, controller 385 correspondingly configures user modem 387 and transceiver Channels 214, 216, 224, and 226.

Controller 385 configures the transceiver Channels 214, 216, 224, and 226 using a plurality of control lines/signals collectively represented by a transceiver mode control bus 377 coupled between controller 385 and the transceiver channels. Transceiver mode control bus 377 provides a switch (mode) select control signal to each of signal routing switches 335, 344, 360 and 370 (and switches 404, 502, and 1100 described in further WCD embodiments below). Therefore, controller 385 can control these RF and IF signal routing switches, in accordance with a user selected operating mode, to thereby configure the WCD operating mode.

Transceiver mode control bus 377 also includes power-on and power-off control lines to activate and deactivate sections of the various transceiver channels in accordance with the mode control commands received through I/O interface 385a. This allows a configuration for saving power when certain sections are not in use.

Controller 385 also provides frequency tuning commands to signal sources 323 and 357, to respectively control the frequencies of reference signals 326 and 356. The frequency tuning commands can be provided to signal sources 323 and 357 using transceiver mode control bus 377, or using a separate, dedicated LO frequency tuning control bus.

Controller 385 also controls satellite and terrestrial call set-ups and tear-downs, in accordance with user commands and information entered through I/O interface 385a. Accordingly, controller 385 can implement the satellite and terrestrial call processing protocols necessary to effect the call set-ups and clear-downs.

As mentioned above in connection with FIG. 2, the user can configure WCD 300 to operate in one of the following operating modes:

1. the satellite communication mode for communicating with the satellite communication system via satellites 108; and 2. the terrestrial communication mode (analog or digital) for communicating with one of the terrestrial communication systems mentioned above.

III. WCD Second Embodiment

Figure 4:
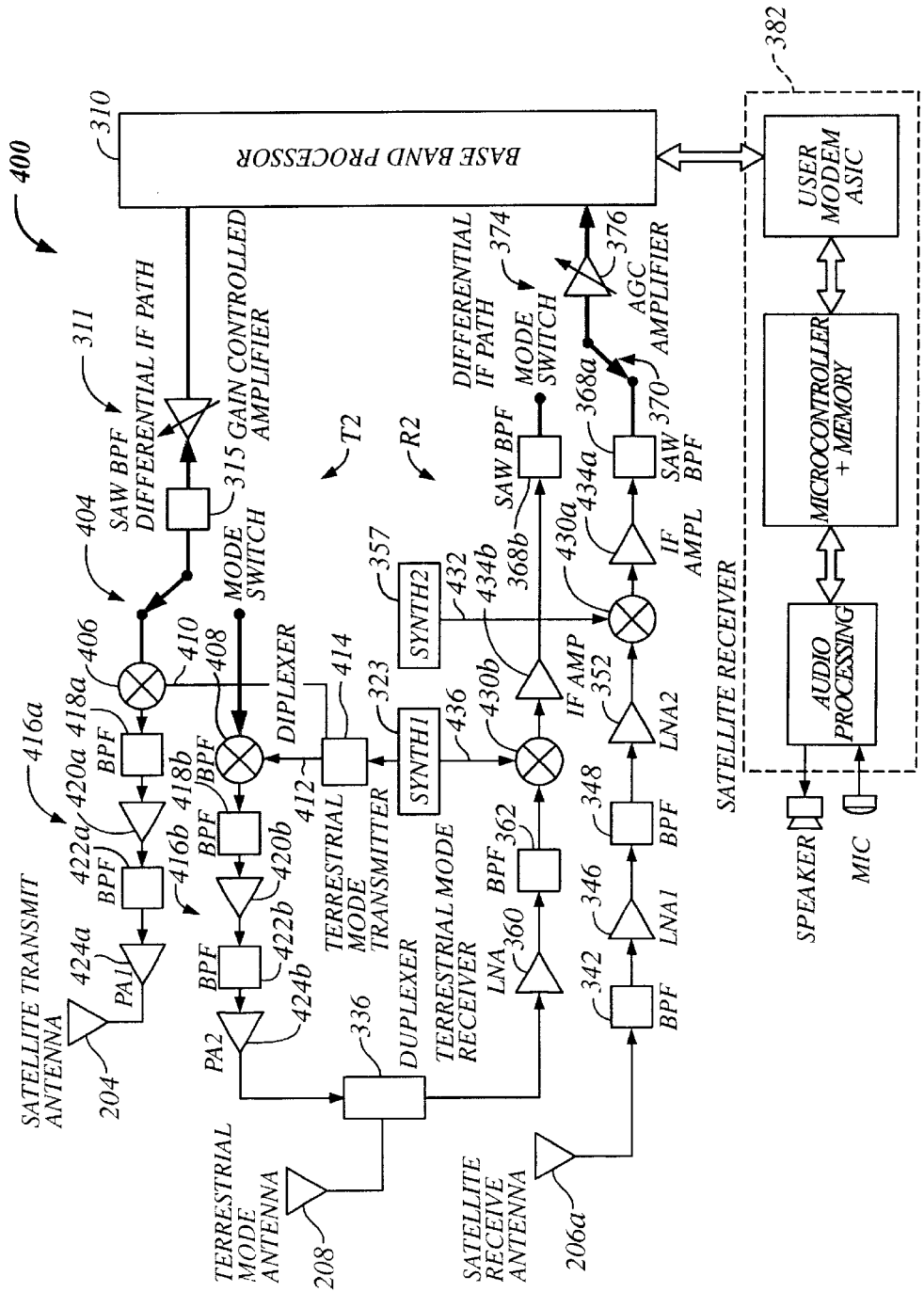
FIG. 4 is a detailed block diagram of the WCD of FIG. 2, including a second transmit arrangement and a second receive arrangement, according to a second embodiment.

FIG. 4 is a detailed block diagram of a WCD 400, according to a second embodiment of the invention.

A. Satellite and Terrestrial Communication Transmit Channels

WCD 400 includes a second transmit arrangement T2 of Satellite and Terrestrial Transmit Channels 214 and 224 (depicted in FIG. 2) to produce RF transmit signals 112 and 124/128. In Transmit Channels 214 and 224, common transmit IF signal section or path 311 (described above in connection with FIG. 3) provides the amplified, filtered IF signal to an input of an IF routing mechanism, such as an IF switch 404. Switch 404 selectively routes the IF signal produced by IF section 311 to either:

1. a satellite signal up-converter, such as a mixer 406, or
2. a separate terrestrial signal up-converter, such as a mixer 408, depending on whether the IF signal at the switch input corresponds to a satellite or a terrestrial transmit signal, respectively (that is, depending on whether WCD 400 is in the satellite or the terrestrial transmit mode).

Mixer 406 frequency up-converts the IF signal routed thereto to an RF transmit signal having a frequency corresponding to a transmit frequency band of the satellite communication system, based on a first LO reference signal 410 provided to the mixer. On the other hand, mixer 408 frequency up-converts the IF signal routed thereto to an RF transmit signal having a frequency corresponding to a transmit frequency band of the terrestrial communication system, based on a second LO reference signal 412. LO reference source 323 provides an LO signal to an LO diplexer 414. Diplexer 414 produces either reference signal 410 or 412 depending on whether the LO signal has a frequency corresponding to the satellite or terrestrial frequency band, respectively.

Satellite transmit mixer 406 provides an RF signal to an RF transmit section 416a, including the following components configured to operate in the satellite transmit frequency band: a first RF BPF 418a following the mixer; an RF amplifier 420a following the BPF; a second BPF 422a following the RF amplifier; and an RF power amplifier 424a following the second BPF. RF power amplifier 424a provides a power amplified RF transmit signal to satellite transmit antenna 204.

Terrestrial transmit mixer 408 provides an RF signal to an RF transmit section 416b similar to 416a, except the RF components are configured to operate in the terrestrial transmit frequency band. RF transmit section 416b provides a power amplified RF transmit signal to duplexer 336.

B. Satellite and Terrestrial Communication Receive Channels

WCD 400 includes a second receive arrangement R2 of Satellite and Terrestrial Receive Channels 216 and 226. The second receive arrangement omits both satellite communication antenna/patch receive antenna selection switch 344 (because patch antenna 206b is also omitted) and RF power combiner 350 of WCD 300, whereby Satellite and Terrestrial Receive channels 216 and 226 maintain independent RF paths up to and including first and second separate frequency down-converters of the respective Receive Channels, as will now be described.

Satellite Receive Channel 216 includes a satellite frequency down-converter, such as a mixer 430a, following LNA 352 of the satellite RF receive section (comprising BPF 342, LNA 346, BPF 348, and LNA 352). Mixer 430*a* frequency down-converts the received RF satellite signal to an IF signal based on a reference signal 432 provided to the mixer. In the depicted embodiment, LO signal source 357 provides signal 432 to mixer 430*a*. Mixer 430*a* provides the IF signal to an IF amplifier 434*a* and then to BPF 368*a*. BPF 368*a* provides a filtered IF satellite signal to the first input of IF switch 370.

In Terrestrial Receive Channel 226, mixer 430*b* frequency down-converts the received RF terrestrial signal to an IF signal based on a reference signal 436 provided to the mixer. In the depicted embodiment, LO signal source 323 provides LO signal 436 to the mixer. LO signal source 323 includes an output power splitter enabling the source to provide LO signal 436 to mixer 430*b*, and an additional signal to diplexer 414 (mentioned above). Mixer 430*b* provides the IF signal to an IF amplifier 434*b* and then to BPF 368*b*. BPF 368*b* provides a filtered IF terrestrial signal to the second input of IF switch 370.

In the satellite receive mode, switch 370 is configured as depicted in FIG. 4 to route the IF satellite signal to AGC amplifier 376. Conversely, in the terrestrial receive mode, switch 370 is configured to route the IF terrestrial signal from BPF 368*b* to AGC amplifier 376.

IV. WCD Third Embodiment

Figure 5:
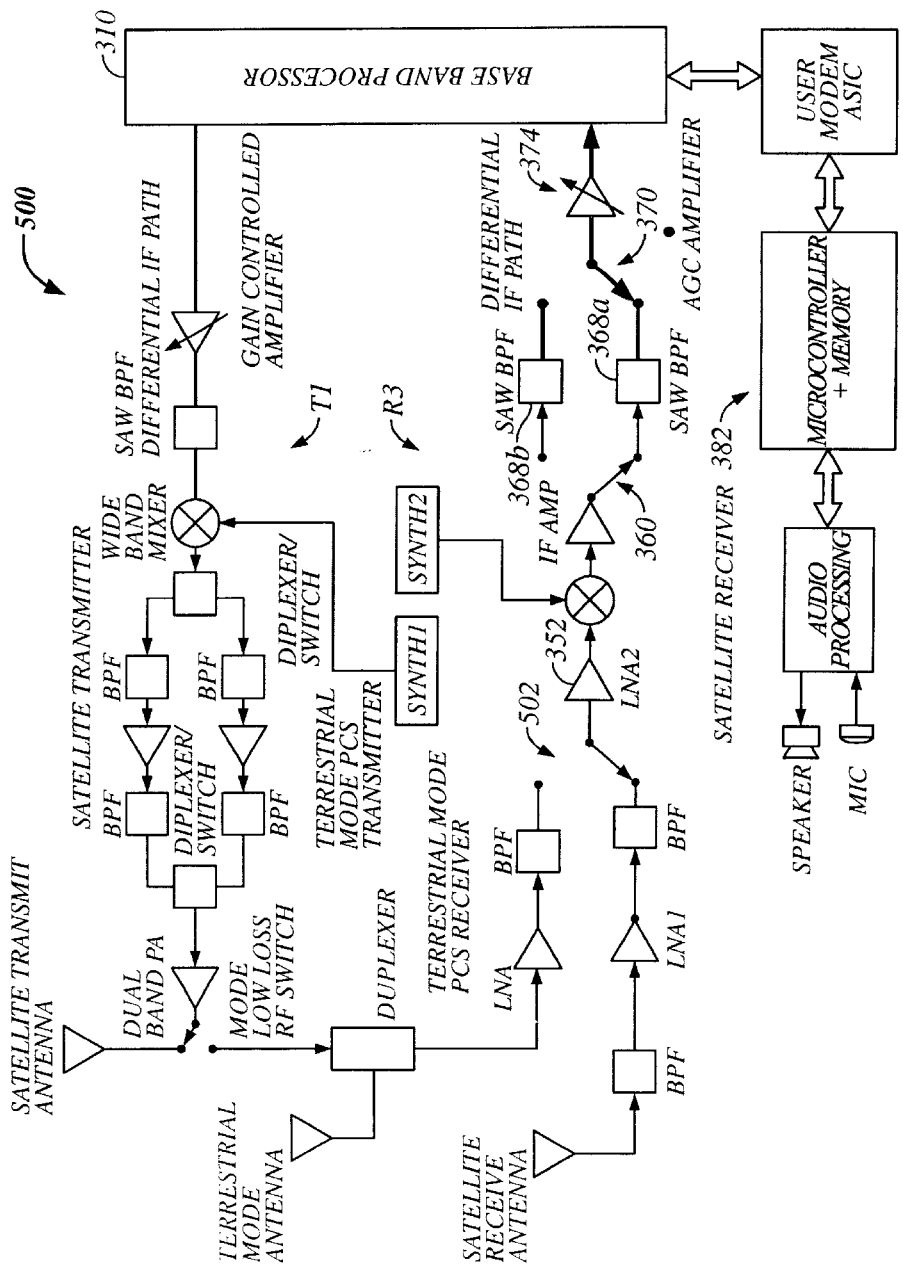
FIG. 5 is a detailed block diagram of the WCD of FIG. 2, including the first transmit arrangement and a third receive arrangement, according to a third embodiment.

FIG. 5 is a detailed block diagram of a WCD 500, according to a third embodiment of the invention.

WCD 500 includes the first transmit arrangement T1 of Satellite and Terrestrial Transmit Channels 214 and 224, as described above in connection with FIG. 3.

WCD 500 includes a third receive arrangement R3 of Satellite and Terrestrial Receive Channels 216 and 226. The third receive arrangement R3 is similar to the first receive arrangement R1 described above in connection with FIG. 3, except that the third arrangement replaces power combiner 350 of the first receive arrangement with a selectively controlled RF switch 502. RF switch 502 selectively routes either a satellite received RF signal or a terrestrial received RF signal to LNA 352, depending on whether it is desired to receive a satellite or a terrestrial signal.

V. WCD Fourth Embodiment

Figure 6:
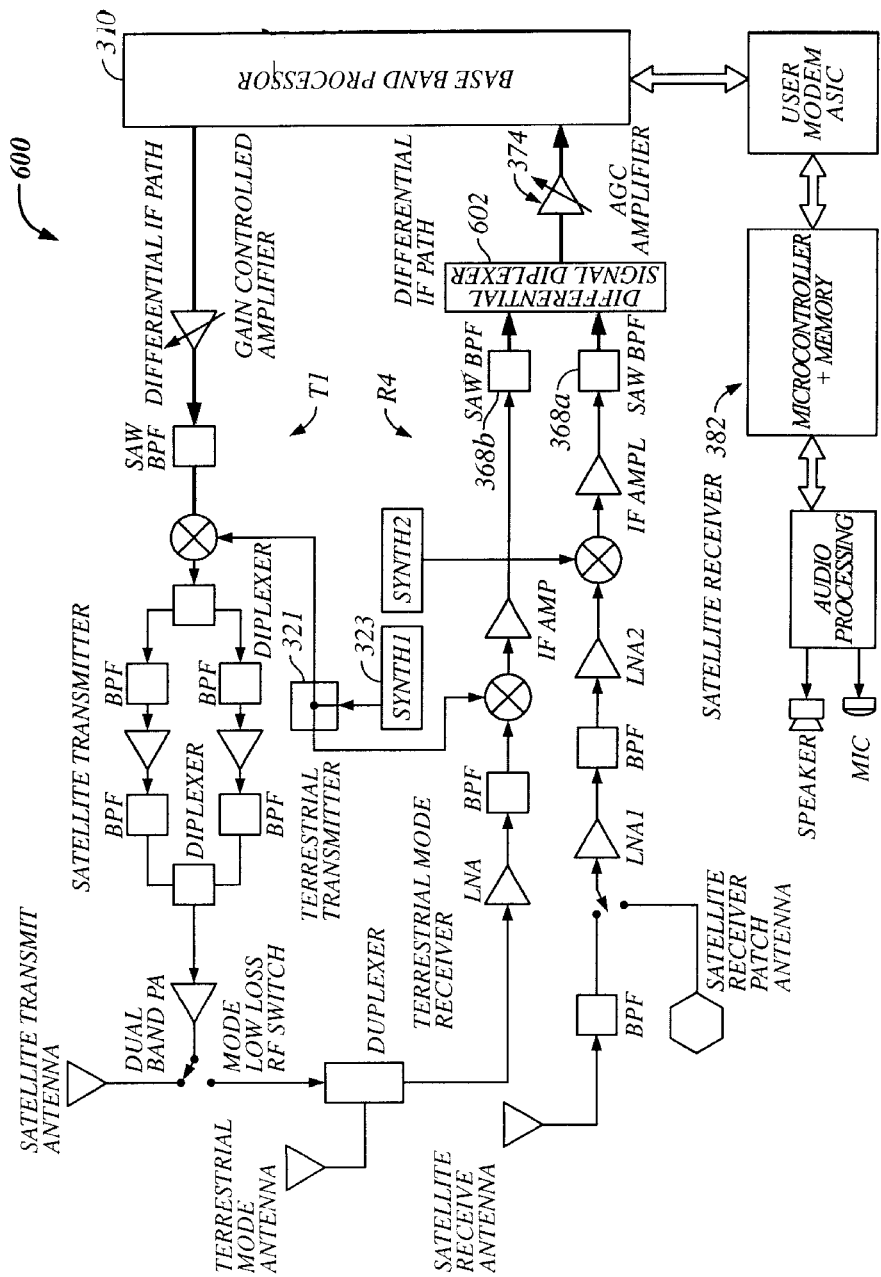
FIG. 6 is a detailed block diagram of the WCD of FIG. 2, including the first transmit arrangement and a fourth receive arrangement, according to a fourth embodiment.

FIG. 6 is a detailed block diagram of a WCD 600, according to a fourth embodiment.

WCD 600 includes the first transmit arrangement T1 of Satellite and Terrestrial Transmit Channels 214 and 224, as described above in connection with FIG. 3.

WCD 600 includes a fourth receive arrangement R4 of Satellite and Terrestrial Receive Channels 216 and 226. The fourth receive arrangement is most similar to the second receive arrangement R2 described above in connection with FIG. 4, except that the fourth receive arrangement R4 replaces IF switch 370 of the second receive arrangement R2 with a differential IF signal diplexer 602 to route satellite and terrestrial IF signals to the common IF section 374.

LO source 323 provides its output through a power splitter 321 enabling the source to provide LO signals at the desired frequencies to both transmit arrangement T1 and receive arrangement R4, as appropriate.

VI. WCD Fifth Embodiment

Figure 7:
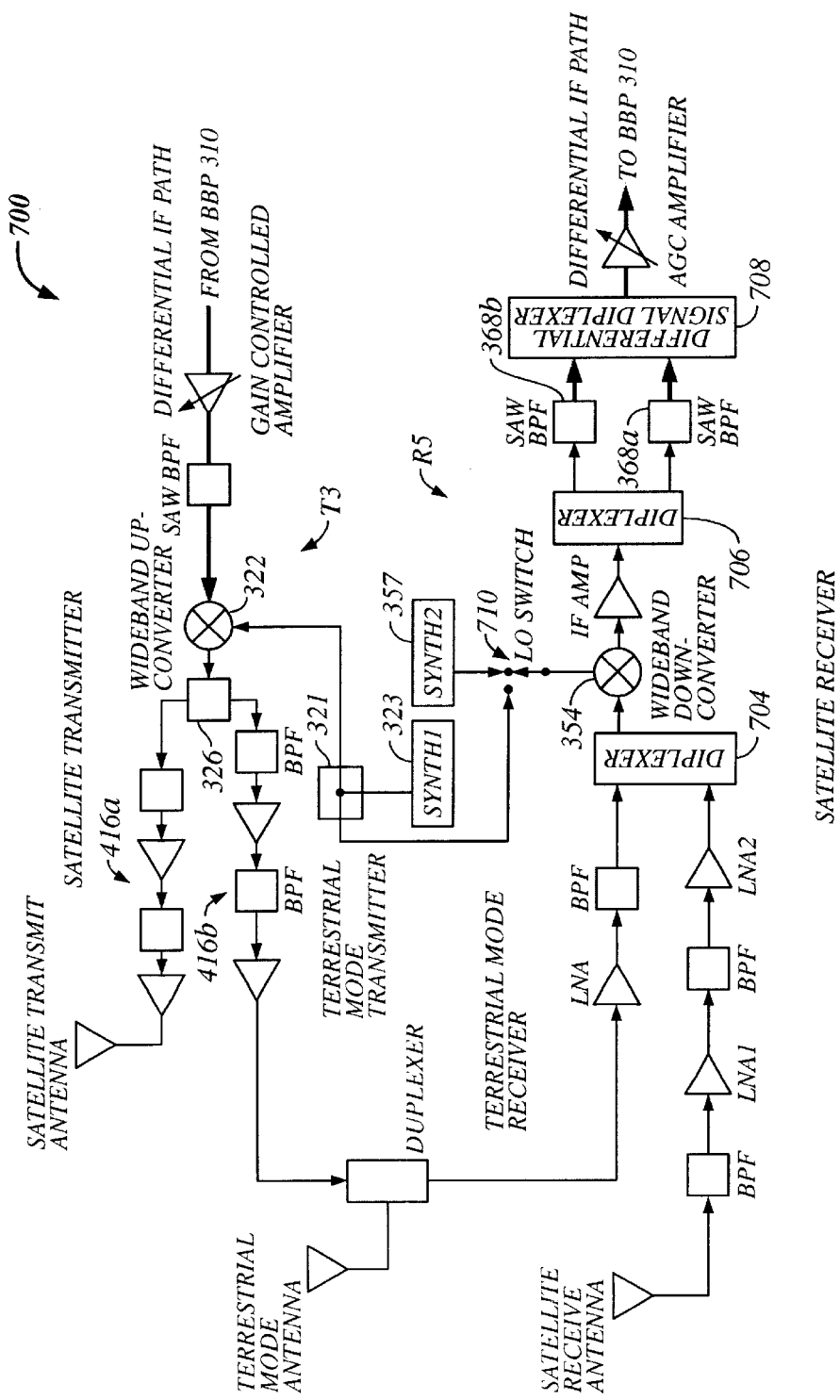
FIG. 7 is a detailed block diagram of the WCD of FIG. 2, including a third transmit arrangement and a fifth receive arrangement, according to a fifth embodiment.

FIG. 7 is a detailed block diagram of a WCD 700, according to a fifth embodiment of the invention.

WCD 700 includes a third transmit arrangement T3 of Satellite and Terrestrial Transmit Channels 214 and 224. The third transmit arrangement T3 includes wide-band frequency up-converting mixer 322 and diplexer 326 following the mixer, similar to first transmit arrangement T1. However, unlike the first transmit arrangement T1, third transmit arrangement T3 also includes separate satellite and terrestrial RF transmit paths 416*a* and 416*b*, similar to the second transmit arrangement T2.

WCD 700 includes a fifth receive arrangement R5 of Satellite and Terrestrial Receive Channels 216 and 226. The fifth receive arrangement R5 is most similar to the third receive arrangement R3 mentioned above in connection with FIG. 5, except that the fifth receive arrangement replaces RF switch 502, and first and second IF switches 360 and 370 of the third receive arrangement, with an RF signal diplexer 704, a first differential IF signal diplexer 706, and a second differential IF signal diplexer 708 (which can be the same as diplexer 602 of FIG. 6), respectively.

Also, WCD 700 includes an LO switch 710 to selectively route an LO reference signal from either reference source 323, or alternatively, from reference signal source 357, to wide-band down converting mixer 354. Reference source 323 provides a common reference signal source to mixers 322 and 354 in the terrestrial mode, that is, when communicating with a terrestrial communication system, only.

VII. WCD Sixth Embodiment

Figure 8:
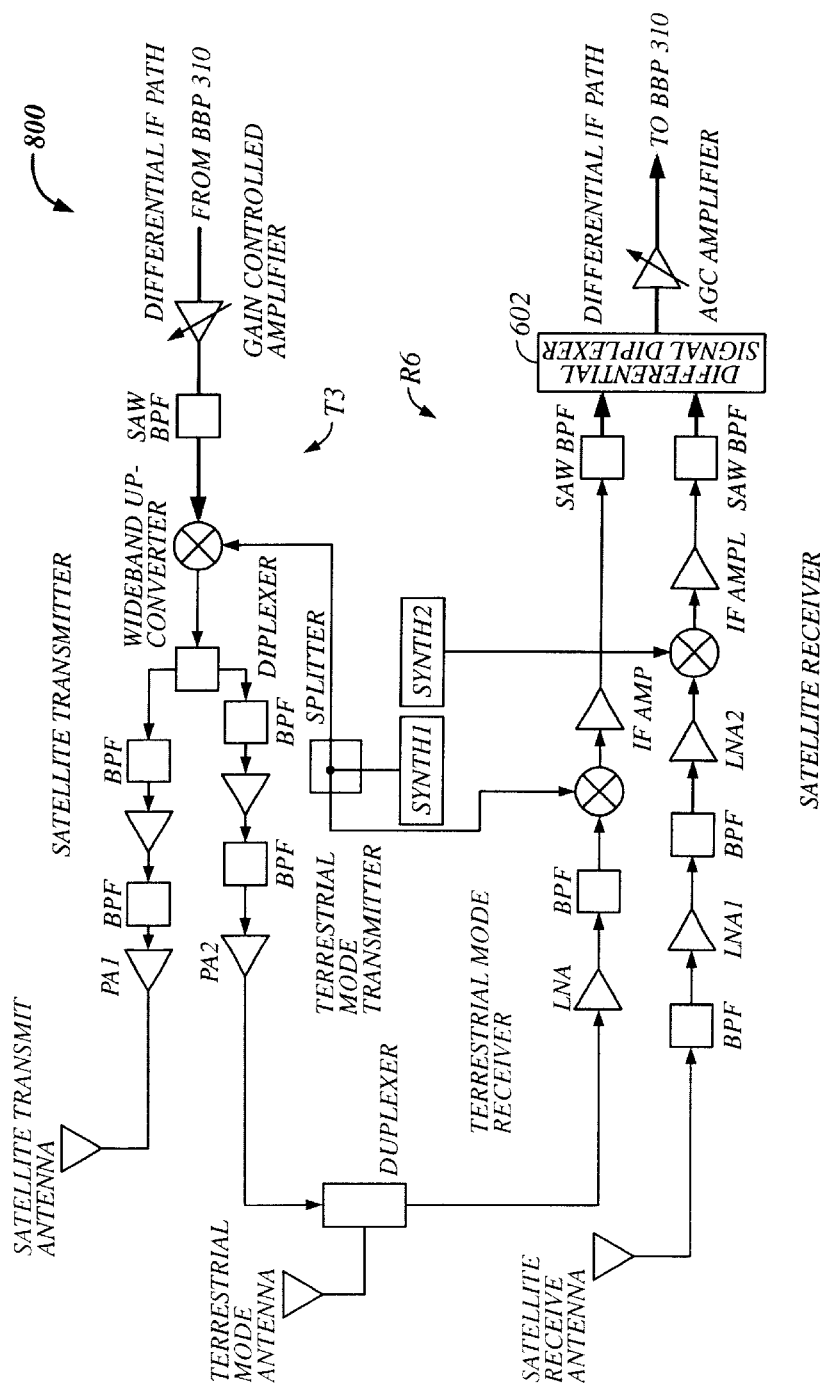
FIG. 8 is a detailed block diagram of the WCD of FIG. 2, including the third transmit arrangement and a sixth receive arrangement, according to a sixth embodiment.

FIG. 8 is a detailed block diagram of a WCD 800, according to a sixth embodiment.

WCD 800 includes the third transmit arrangement T3 of Satellite and Terrestrial Transmit Channels 214 and 224.

WCD 800 includes a sixth receive arrangement R6 of Satellite and Terrestrial Receive Channels 216 and 226. The sixth receive arrangement R6 is similar to the second and fourth receive arrangements R2 and R4, except that patch antenna 206*b* is omitted, and diplexer 602 replaces IF switch 370.

VIII. WCD Seventh Embodiment

Figure 9:
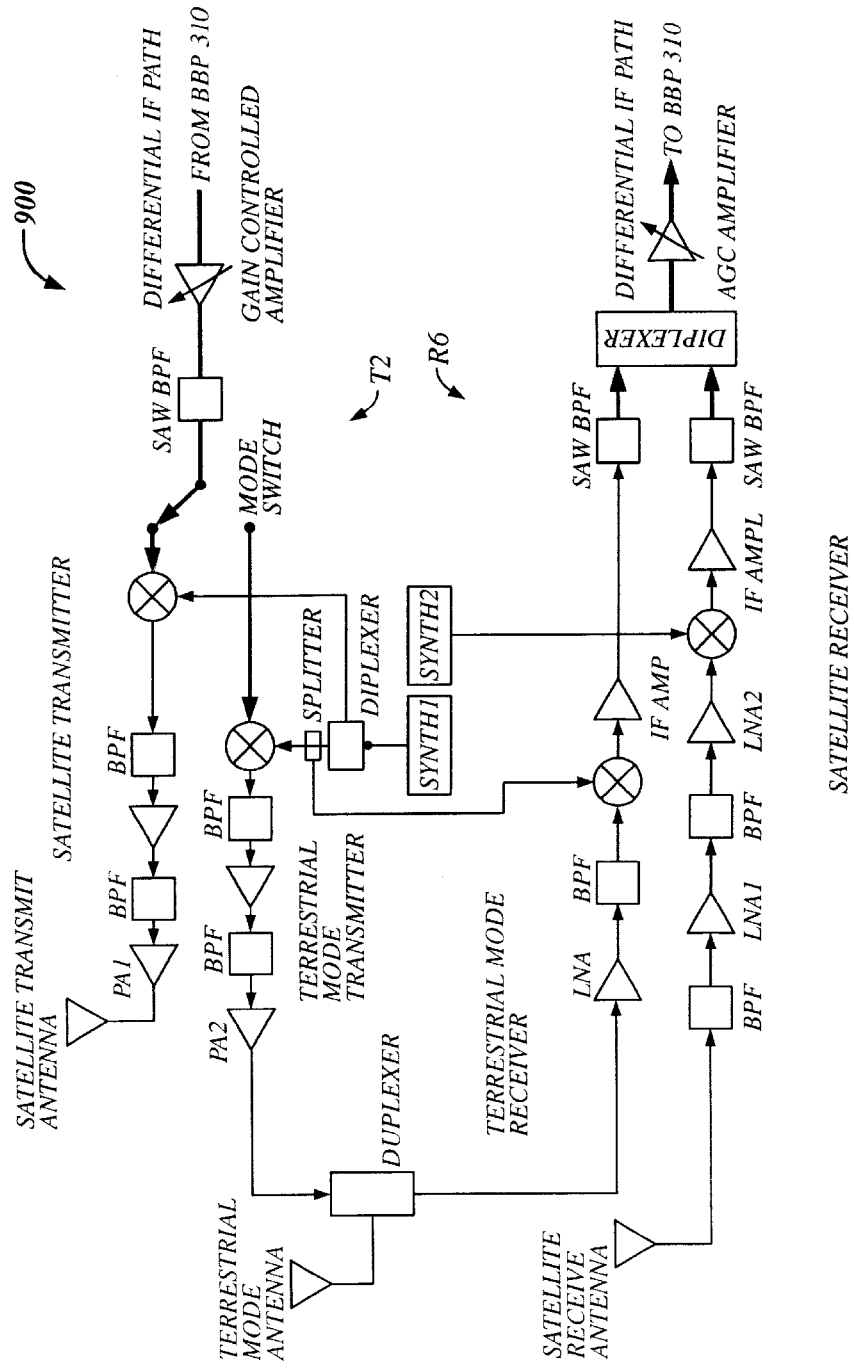
FIG. 9 is a detailed block diagram of the WCD of FIG. 2, including the second transmit arrangement.

FIG. 9 is a detailed block diagram of a WCD 900, according to a seventh embodiment of the invention.

WCD 900 includes the second transmit arrangement T2 of Satellite and Terrestrial Transmit Channels 214 and 224.

WCD 900 includes the sixth receive arrangement R6 of Satellite and Terrestrial Receive Channels 216 and 226, mentioned above in connection with FIG. 8.

IX. WCD Eighth Embodiment

Figure 10:
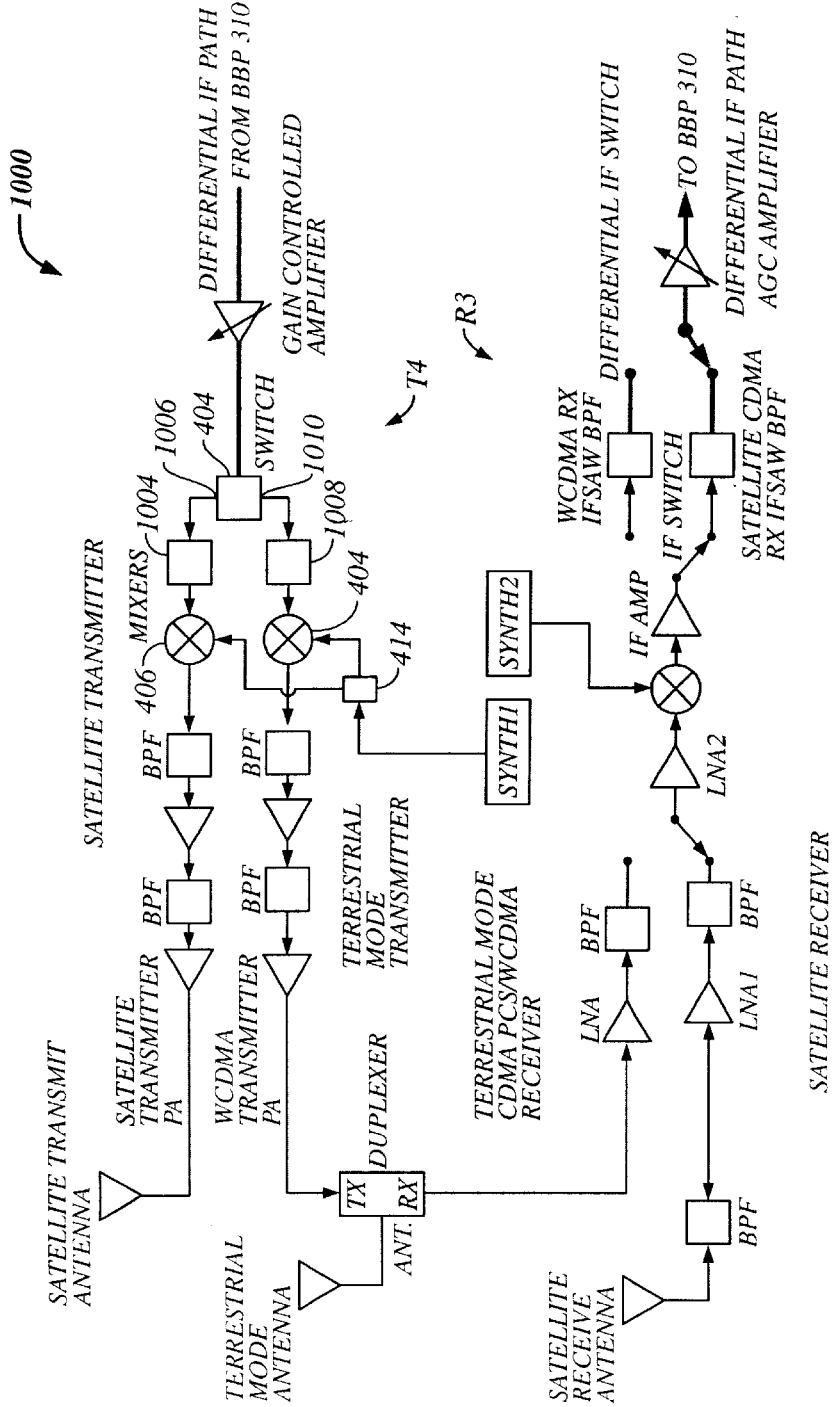
FIG. 10 is a detailed block diagram of the WCD of FIG. 2, including a fourth transmit arrangement and the third receive arrangement, according to an eighth embodiment.

FIG. 10 is a detailed block diagram of a WCD 1000, according to an eighth embodiment.

WCD 1000 includes a fourth transmit arrangement T4 of Satellite and Terrestrial Transmit Channels 214 and 224. Fourth transmit arrangement T4 is similar to second transmit arrangement T2, discussed above in connection with FIG. 4, except that IF BPF 315 of transmit arrangement T2 is omitted. Instead, transmit arrangement T4 includes:

1. an IF BPF filter 1004 between an output 1006 of switch 404 and satellite mixer 406, to filter satellite transmit IF signals routed thereto by the switch 408; and
2. an IF BPF filter 1008 between an output 1010 of switch 404 and terrestrial mixer 404, to filter terrestrial transmit IF signals routed thereto by the switch 404.

IF BPF 1008 has a frequency bandwidth compatible with the terrestrial transmit signals to be filtered thereby, such as analog or digital cellular, PCS, cdma2000, or WCDMA signals, etc. In an alternative arrangement, BPF 1008 is omitted.

WCD 1000 also includes the third receive arrangement R3 of Satellite and Terrestrial Receive Channels 216 and 226, discussed above in connection with FIG. 5. In an alternative arrangement, third receive arrangement R3 is replaced by second receive arrangement R2 discussed above in connection with FIG. 4.

X. WCD Ninth Embodiment

Figure 11:
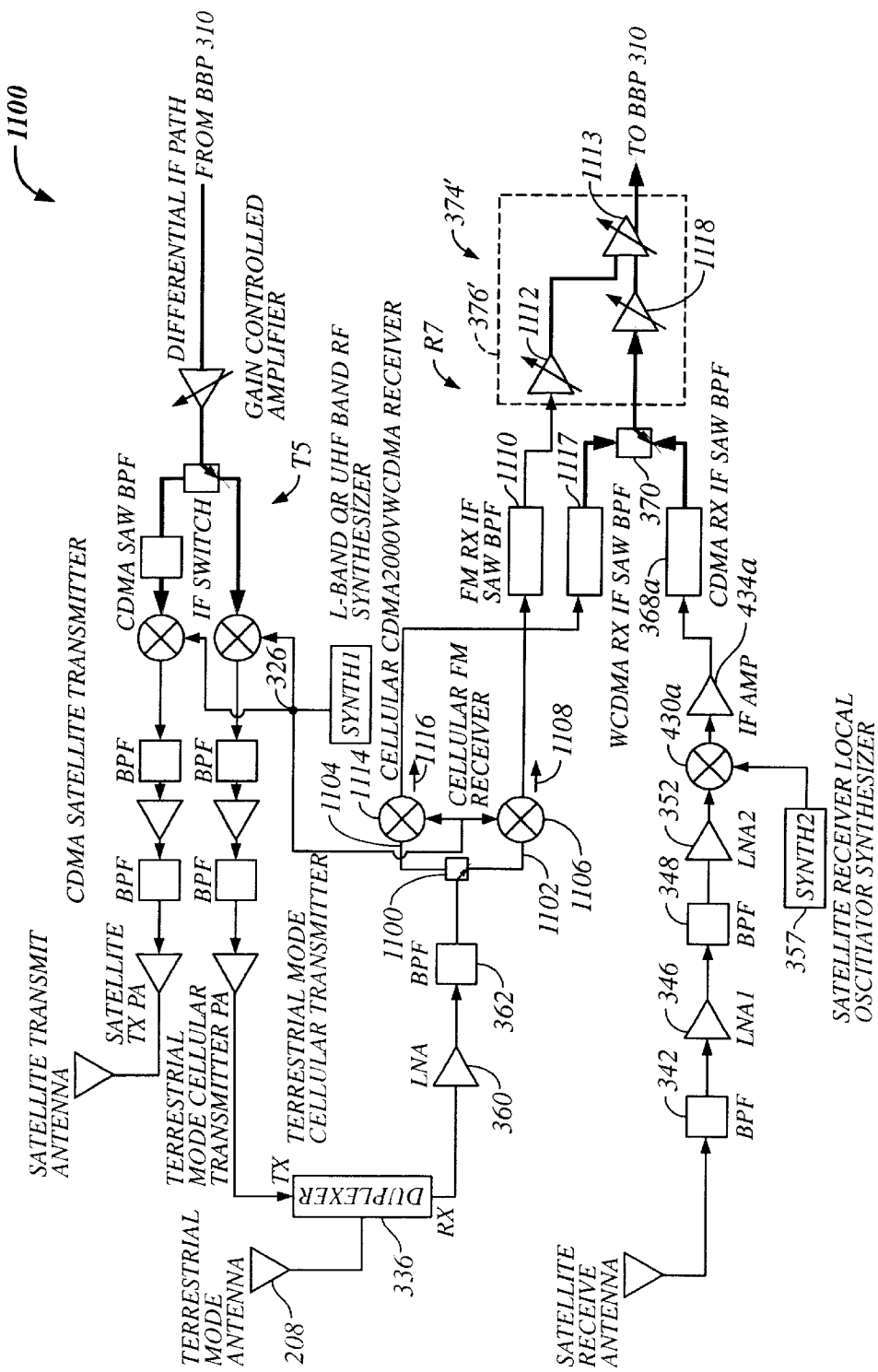
FIG. 11 is a detailed block diagram of the WCD of FIG. 2, including a fifth transmit arrangement and a seventh receive arrangement, according to a ninth embodiment.

FIG. 11 is a detailed block diagram of a WCD 1100, according to a ninth embodiment of the invention.

WCD 1100 includes a fifth transmit arrangement T5 of Satellite and Terrestrial Transmit Channels 214 and 224. Fifth transmit arrangement T5 is similar to fourth transmit arrangement T4, discussed above in connection with FIG. 10, except IF BPF 1008 of transmit arrangement T4 is omitted. In an alternative arrangement of WCD 1100, transmit arrangement T5 can be replaced with transmit arrangement T4.

A. Satellite and Terrestrial Receive Arrangement

WCD 1100 includes a seventh receive arrangement R7 of Satellite and Terrestrial Receive Channels 216 and 226. In receive arrangement R7, Satellite Receive Channel 216 is similar to that of receive arrangement R3, discussed above in connection with FIG. 4, except that Satellite Receive Channel 216 includes an AGC amplifier assembly 376' forming part of a common IF section 374', as is further described below.

B. Terrestrial Receive Channel

In receive arrangement R7, Terrestrial Receive Channel 226 comprises common antenna 208, duplexer 336, LNA 360, and BPF 362, similar to the previously described receive arrangements. However, unlike the previously described receive arrangements, BPF 362 provides the received RF (terrestrial) signal to a selective RF signal routing mechanism 1100. Routing mechanism 1100 can be an RF switch to selectively route an RF signal at an input of the switch to either of a first RF signal output path 1102 or a second RF signal output path 1104, based on a select control signal (not shown) provided to the RF switch.

1. Terrestrial Receive Analog Sub-Channel

Terrestrial Receive Channel 226 comprises a first sub-channel associated with first switched RF output path 1102. In one embodiment, this first sub-channel can receive and process cellular analog signals, comprising frequency modulated signals, such as AMPS signals. In a cellular analog mode, RF switch 1100 provides a switched RF signal to path 1102, and, thus, to a mixer 1106 in the first sub-channel. Mixer 1106 frequency down-converts the switched RF signal to an IF signal 1108 based on LO reference signal 326 provided to mixer 1106. Mixer 1106 provides IF signal 1108 to a BPF 1110, which can be a SAW filter. BPF 1110 has a frequency bandwidth compatible with a frequency bandwidth of the cellular FM receive signal it is to filter. BPF 1110 provides a filtered IF signal to IF AGC amplifier assembly 376'. IF AGC amplifier assembly 376' comprises an IF AGC amplifier 1112 and a combining IF AGC amplifier 1113. BPF 1110 provides the filtered IF signal to AGC amplifier 1112, and AGC amplifier 1112 provides a further amplified IF signal to AGC combining amplifier 1113. In turn, AGC combining amplifier 1113 provides an amplified IF signal to baseband processor 310.

2. Terrestrial Receiver Digital Sub-Channel

Terrestrial Receive Channel 226 also comprises a second sub-channel associated with second switched RF output path 1104. In one embodiment, the second sub-channel receives and processes cellular CDMA (such as CDMA2000, CDMA 3X, or WCDMA) or TDMA digital signals. In a digital cellular mode, RF switch 1100 provides a switched RF signal to signal path 1104, and, thus, to a mixer 1114 in the second sub-channel. Mixer 1114 frequency down-converts the switched RF signal to a received IF signal 1116. Mixer 1114 provides IF signal 1116 to the second input of IF switch 370 through an IF BPF 1117, such as a SAW filter having a bandwidth compatible with a frequency bandwidth of the digital cellular signal received thereby. When in the digital cellular mode, switch 370 routes IF signal 1116 to an AGC amplifier 1118 of AGC amplifier assembly 376'. In turn, AGC amplifier 1118 provides the digital cellular signal to AGC combining amplifier 1113.

XI. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are, thus, within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What I claim as my invention is:

1. A multi-mode Wireless Communication Device (WCD) for communicating with a satellite communication system and a at least one of several terrestrial communication systems, comprising:

a satellite transmit channel to produce a satellite Radio Frequency (RF) transmit signal to be transmitted to at least one satellite of the satellite communication system;

a satellite receive channel to receive and process an RF signal transmitted by at least one satellite;

a terrestrial transmit channel to produce a terrestrial RF transmit signal to be transmitted to at least one of a plurality of terrestrial communication systems; and a terrestrial receive channel to receive and process an RF signal transmitted by at least one of a plurality of the terrestrial communication systems, being configured to allow concurrent communication with said satellite receive channel.

2. The WCD of claim 1, wherein the satellite communication system is a Low Earth Orbit (LEO) satellite communication system, the satellite RF transmit signal transmitted to the satellite having a frequency corresponding to the LEO satellite communication frequency transmit band for a LEO satellite communication system Earth terminal, the RF signal transmitted by the satellite and received by the WCD satellite receive channel having a frequency compatible with the LEO satellite communication system frequency receive band for the LEO satellite communication system Earth terminal, and said transmit and receive bands are different.

3. The WCD of claim 2 wherein said transmit and receive bands comprise 2500 Megahertz (MHz) and 1600 MHz, respectively.

4. The WCD of claim 1, wherein the terrestrial communication system comprises one of an analog cellular communication system and a digital cellular communication system, the terrestrial RF transmit signal having a frequency corresponding to the cellular frequency transmit band for a cellular mobile transceiver, the RF signal transmitted by the cellular communication system having a frequency corresponding to the cellular frequency receive band for the cellular mobile transceiver.

5. The WCD of claim 1, wherein the terrestrial communication system comprises a Personal Communications Service (PCS) system, the terrestrial RF transmit signal having a frequency corresponding to a PCS frequency transmit band for a PCS mobile transceiver, the RF signal transmitted by the PCS system having a frequency corresponding to a PCS frequency receive band for the PCS mobile transceiver.

6. The WCD of claim 1, wherein each of the satellite and terrestrial transmit channels comprises:
an Intermediate Frequency (IF) section;
a frequency up-converter following the IF section; and
a Radio Frequency (RF) section following the frequency up-converter.

7. The WCD of claim 6, wherein the satellite and the terrestrial transmit channel IF sections share a common transmit IF path.

8. The WCD of claim 7, wherein the satellite and the terrestrial transmit channel up-converters are a common dual-band mixer shared between the satellite and terrestrial transmit channels to frequency up-convert a transmit IF signal produced by the common transmit IF path to one of:
a satellite RF signal having a frequency corresponding to the satellite communication system; and
a terrestrial RF signal having a frequency corresponding to the terrestrial communication system.

9. The WCD of claim 8, further comprising a Local Oscillator (LO) to provide an LO signal to an LO input of the common mixer.

10. The WCD of claim 8, wherein:
the satellite transmit channel RF section comprises a satellite RF path;
the terrestrial transmit channel RF section comprises a terrestrial RF path separate from the satellite RF path; and
the satellite and the terrestrial transmit channels comprise a first common routing mechanism, following the common mixer to selectively route satellite and terrestrial RF signals from the common mixer to the satellite and terrestrial separate RF paths, respectively.

11. The WCD of claim 10, wherein the satellite and the terrestrial channels further comprise:
a second common routing mechanism to route RF signals from the separate satellite and terrestrial RF paths, respectively, to an output of the second common routing mechanism; and
a common dual-band power amplifier following the second common routing mechanism output, to power amplify the RF signals routed to the common power amplifier.

12. The WCD of claim 11, further comprising a common routing mechanism following the common power amplifier to selectively route a power amplified RF signal produced by the common power amplifier to either of a satellite antenna and a terrestrial antenna.

13. The WCD of claim 7, wherein the satellite frequency up-converter is a mixer and the terrestrial frequency up-converter is a mixer separate from the satellite mixer, the satellite and terrestrial channels further comprise a common signal routing mechanism following the common transmit IF path to selectively route
a satellite IF signal from the common IF to the satellite transmit channel mixer, and
a terrestrial IF signal from the common IF to the terrestrial transmit channel mixer.

14. The WCD of claim 12, further comprising a dual-band Local Oscillator (LO) to provide an LO signal to an LO input of each of the satellite and terrestrial transmit channel mixers.

15. The WCD of claim 12, wherein the satellite and terrestrial RF sections are separate from one another, and each comprises a power amplifier to provide power amplified RF signals to a respective satellite and terrestrial antenna.

16. The WCD of claim 1, wherein each of the satellite and the terrestrial receive channels comprises:
an RF section;
a frequency down-converter following the RF section; and
an Intermediate Frequency (IF) section following the frequency down-converter.

17. The WCD of claim 16, wherein the satellite and the terrestrial receive channel IF sections share a common receive IF path.

18. (Original)The WCD of claim 17, wherein the satellite and the terrestrial receive channel frequency down-converters are a common mixer shared between the satellite and terrestrial receive channels, the satellite and the terrestrial receive channels further comprising a common RF routing mechanism preceding the common mixer to route a received RF signal from the satellite receive channel RF section and a received RF signal from the terrestrial receive channel RF section to a common output of the RF routing mechanism.

19. The WCD of claim 17, further comprising a Local Oscillator (LO) to provide an LO signal to an LO input of the common mixer.

20. The WCD of claim 18, wherein the common RF routing mechanism comprises one of an RF switch, an RF power combiner, and an RF frequency selective diplexer.

21. The WCD of claim 20, wherein
the satellite receive channel IF section comprises a satellite receive IF path, and
the terrestrial receive channel IF section comprises a terrestrial receive IF path separate from the satellite receive IF path, the satellite and terrestrial receive channels further comprising a common first IF routing mechanism following the common mixer to selectively route an IF signal from the common mixer to:
(a) the satellite IF signal path when the IF signal corresponds to a received satellite signal, and
(b) the terrestrial IF signal path when the IF signal corresponds to a received terrestrial signal.

22. The WCD of claim 21, wherein the satellite and terrestrial receive channels further comprise a second common IF routing mechanism following the satellite and terrestrial separate IF paths to route an IF signal from either of the satellite and terrestrial separate IF paths to the common received IF path.

23. The WCD of claim 22, wherein each of the common first and second IF routing mechanisms comprises one of an IF switch and a frequency selective diplexer.

24. The WCD of claim 17, wherein the satellite and terrestrial receive channel frequency down-converters comprise separate mixers, the satellite receive channel IF section comprises a satellite IF path between the satellite channel mixer and the common receive IF path, the terrestrial receive channel IF section comprises a terrestrial IF path between the terrestrial channel mixer and the common receive IF path and separate from the satellite IF path.

25. The WCD of claim 24, wherein the satellite and the terrestrial receive channels further comprise a common IF routing mechanism to route IF signals from the separate satellite and terrestrial IF paths respectively to the common receive IF path.

26. The WCD of claim 17, wherein the satellite and the terrestrial IF sections comprise a differential IF path.

27. The WCD of claim 1, wherein each of the satellite and terrestrial transmit channels comprise:

a transmit Intermediate Frequency (IF) section;

a frequency up-converter following the IF section; and a transmit Radio Frequency (RF) section following the frequency up-converter, wherein the satellite and terrestrial transmit IF sections share a common transmit IF path; and wherein each of the satellite and terrestrial receive channels comprises:

a receive RF section;

a frequency down-converter following the RF section; and a receive IF section following the frequency down-converter, wherein the satellite and terrestrial receive IF sections share a common receive IF path.

28. The WCD of claim 1, wherein the terrestrial communication system comprises one or more terrestrial communication systems capable of transmitting a first signal modulated using a digital modulation technique and a second signal modulated using an analog modulation technique, the terrestrial receive channel comprising:

a first sub-channel to receive the first signal modulated using the digital modulation technique; and a second sub-channel to receive the second signal modulated using the analog modulation technique.

29. The WCD of claim 28, further comprising a routing mechanism to selectively route the first signal to the first sub-channel and the second signal to the second sub-channel.

30. The WCD of claim 28, wherein each of the first and second sub-channels comprises:

an RF section;

a frequency down-converter following the RF section; and an Intermediate Frequency (IF) section following the frequency down-converter.

31. A method for communicating with a satellite communication system and at least one terrestrial communication system, comprising:

producing a satellite Radio Frequency (RF) transmit signal to be transmitted to at least one satellite of the satellite communication system;

receiving and processing an RF signal transmitted by at least one satellite;

producing a terrestrial RF transmit signal to be transmitted to at least one of a plurality of terrestrial communication systems; and receiving and processing an RF signal transmitted by at least one of a plurality of terrestrial communication systems, on occasion concurrent with satellite signal reception.

32. The method of claim 31, wherein each of the satellite and the terrestrial receive channels comprises:

an RF section;

a frequency down-converter following the RF section; and an Intermediate Frequency (IF) section following the frequency down-converter.

33. The method of claim 32, wherein the satellite and the terrestrial receive channel IF sections share a common receive IF path.

34. The method of claim 33, comprising performing frequency down-conversion by transferring the satellite and the terrestrial receive channel signals through a common mixer shared between satellite and terrestrial receive channels.

35. The method of claim 34, comprising, transferring satellite and the terrestrial receive channel signals through a common RF routing mechanism preceding the common mixer so as to route a received RF signal from the satellite receive channel RF section and a received RF signal from the terrestrial receive channel RF section to a common output of the RF routing mechanism.

36. The method of claim 35, further comprising proving an output from a Local Oscillator to an LO input of the common mixer.

37. The WCD of claim 31, further comprising a second terrestrial communication system comprising a PCS system having a transmit frequency corresponding to a PCS frequency transmit band for a PCS mobile transceiver, the terrestrial RF transmit signal capable of having RF signals transmitted having a frequency corresponding to a PCS frequency receive band for the PCS mobile transceiver.

38. Apparatus for communicating with a satellite communication system and at least one terrestrial communication system, comprising:

means for producing a satellite Radio Frequency (RF) transmit signal to be transmitted to at least one satellite of the satellite communication system;

means for receiving and processing an RF signal transmitted by at least one satellite;

means for producing a terrestrial RF transmit signal to be transmitted to at least one terrestrial communication systems; and means for receiving and processing an RF signal transmitted by the terrestrial communication systems, being configured to allow concurrent communication with said satellite receive channel.

39. Apparatus for communicating with a satellite communication system and a terrestrial communication system, comprising:

means for producing a satellite Radio Frequency (RF) transmit signal to be transmitted to at least one satellite of the satellite communication system over a satellite transmit channel;

means for receiving and processing an RF signal transmitted by at least one satellite over a satellite receive channel;

means for producing a terrestrial RF transmit signal to be transmitted to at least one terrestrial communication system over a terrestrial transmit channel; and means for receiving and processing an RF signal transmitted by the terrestrial communication system over a terrestrial receive channel, being configured to allow concurrent communication with said satellite receive channel.

40. The apparatus of claim 39, wherein the satellite and the terrestrial transmit and receive channels comprise:

means for transferring signals over a common routing mechanism to route RF signals arriving over separate satellite and terrestrial RF paths, respectively, to an output of the common routing mechanism; and means for inputting an output of the common routing mechanism into a common dual-band power amplifier, and amplifying the RF signals.

41. The apparatus of claim 40, wherein the satellite and the terrestrial transmit and receive channels comprise:

means for transferring signals over a common routing mechanism to route RF signals arriving over separate satellite and terrestrial RF paths, respectively, to an output of the common routing mechanism; and means for inputting an output of the common routing mechanism into a common dual-band power amplifier, and amplifying the RF signals.

* * * * *